(12) United States Patent
Miyabayashi et al.

(10) Patent No.: US 7,948,925 B2
(45) Date of Patent: May 24, 2011

(54) COMMUNICATION DEVICE AND COMMUNICATION METHOD

(75) Inventors: Naoki Miyabayashi, Tokyo (JP);
Yoshihiro Yoneda, Kanagawa (JP); Isao Soma, Saitama (JP); Kazuo Takada, Chiba (JP); Seiji Kuroda, Kanagawa (JP); Yasuharu Ishikawa, Kanagawa (JP); Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 12/367,770

(22) Filed: Feb. 9, 2009

(65) Prior Publication Data

US 2009/0227282 A1    Sep. 10, 2009

(30) Foreign Application Priority Data

Mar. 10, 2008    (JP) .................................. 2008-060329

(51) Int. Cl.
*H04L 5/26* (2006.01)
(52) U.S. Cl. ........ 370/302; 370/295; 370/343; 370/480; 455/552.1; 455/432.1; 455/103
(58) Field of Classification Search .................. 370/386, 370/389, 474, 395.21, 412, 401, 316; 455/40, 455/41.2, 552.1, 552; 713/169, 168, 171, 713/189; 726/9, 20, 26
See application file for complete search history.

(56) References Cited

U.S. PATENT DOCUMENTS

| | | | |
|---|---|---|---|
| 2002/0126675 A1* | 9/2002 | Yoshimura et al. | 370/395.21 |
| 2004/0137915 A1* | 7/2004 | Diener et al. | 455/456.1 |
| 2005/0076128 A1* | 4/2005 | Tsai | 709/227 |
| 2005/0174984 A1* | 8/2005 | O'Neill | 370/349 |

FOREIGN PATENT DOCUMENTS

| | | |
|---|---|---|
| JP | 2003-32261 | 1/2003 |
| JP | 2004-112512 | 4/2004 |
| JP | 2005-167946 | 6/2005 |
| JP | 2005-333188 | 12/2005 |
| JP | 2007-166538 | 6/2007 |
| JP | 2007-215244 | 8/2007 |

* cited by examiner

*Primary Examiner* — Pankaj Kumar
*Assistant Examiner* — Anez Ebrahim
(74) *Attorney, Agent, or Firm* — Oblon, Spivak, McClelland, Maier & Neustadt, L.L.P.

(57) ABSTRACT

A communication device has a first communication section that supports a first communication mode having a low communication rate and a second communication section that supports a second communication mode having a higher communication rate than the first communication mode. The communication device includes a packet generation section and a communication control section. The packet generation section generates a first portion containing authentication information used for connection authentication for the second communication mode and a second portion other than the first portion. The communication control section performs control to cause the first communication section to transmit the first portion and to cause the second communication section to transmit the second portion after the connection authentication succeeds using the authentication information contained in the first portion.

13 Claims, 20 Drawing Sheets

COMMUNICATION DEVICE AND COMMUNICATION METHOD

CROSS REFERENCES TO RELATED APPLICATIONS

The present invention contains subject matter related to Japanese Patent Application JP 2008-060329 filed in the Japanese Patent Office on Mar. 10, 2008, the entire contents of which are incorporated herein by reference.

BACKGROUND OF THE INVENTION

1. Field of the Invention

The present invention relates to communication devices and communication methods.

2. Description of the Related Art

In recent years, technology called "handover" has been used. Wit this technology, two communication means that support respective communication modes that are different from each other can be automatically switched to perform communication. The handover technology is applied to, for example, electronic devices that use infrared communication or contactless near-field communication (hereinafter referred to as "NFC") as a first communication mode and that use a wireless local area network (hereinafter, "WLAN") or Bluetooth® (hereinafter, "PT") as a second communication mode. Such electronic devices use, for example, the first communication mode to transmit authentication information for the second communication mode and use the authentication information to automatically perform authentication setting for the second communication mode. This arrangement allows a user to automatically use a communication function associated with the second communication mode without knowing the authentication processing and the setting processing.

Recently, many standards institutes have proposed technologies called "simple authentication" and "handover" using personal area networks (PAN). For WLANs, such systems are proposed in a Wi-Fi Protected Setup (WPS) standard. In addition, for BT, related systems are proposed in Secure Simple Pairing (SSP) in Core Specification version 2.1. More specifically, SSP standardizes a system in which authentication can be easily performed by exchanging authentication information through NFC communication without the user directly inputting authentication information to a device.

When a wide range of user convenience of users is pursued, not only authentication processing for the second communication mode but also application launch and so on using the first communication mode come into consideration. For example, Japanese Unexamined Patent Application Publication No. 2005-295574 discloses a technology for starting a video conference system by using an infrared communication function of a mobile phone as a trigger. As another example, Japanese Unexamined Patent Application Publication No. 2007-166538 discloses a technology in which a first communication mode is used to exchange information for a second communication mode and an encryption system and data-transferring means is switched into the second communication mode when a compatible system is found. This technology is an example in which the handover technology is applied as a technology for ensuring data confidentiality.

SUMMARY OF THE INVENTION

Information transmitted in infrared communication for realizing the video conference system includes not only the internet address and authentication information of a target communication device (i.e., a device with which communication is to be performed) but also information regarding an application for starting a video phone. This means that a large amount of data is transmitted in the infrared communication, which has a relatively narrow communication bandwidth, and a large amount of time is thus taken for transmission of the data.

With the widespread use of the Internet and an increased number of network-ready devices connected to LANs, there are demands for a method for efficiently detecting devices that provide intended services. To this end, Universal Plug and Play (UPnP) is aimed to achieve a user-desired function by only connecting to a network without involving the user's complicated operation and setting task.

A Simple Service Discovery Protocol (SSDP) specified by UPnP defines a system that states conditions of a search target in accordance with an HTTP format while maintaining desired extensibility. Packets written in accordance with the definition are broadcast to a network to thereby allow the user to easily detect available devices and desired services.

A description will now be given of a case in which a WLAN device is to be connected to an IP network through a handover. In this case, after authentication via handover is completed, a device having a desired service is searched for. A series of tasks, such as designating an application to be launched, is executed with the device having the desired service. This series of tasks is realized using a technology defined by UPnP.

Accordingly, using an HTTP format to state information for executing UPnP processing and transmitting NFC communication packets to which the information is added allows the user to complete, with a very simple operation, a series of processing from authentication processing to application-launching processing.

This approach can enhance the user convenience. However, since information of the application launched using the second communication mode is contained in the packets transmitted in the first communication, there are problems in that the size of the packets in the first communication increases and the communication time also increases.

In general, in many cases, a modulation system and communication protocols for the first communication mode have simple configurations. Thus, the first communication mode is very low in transfer rate compared to the second communication mode and is also, in many cases, limited in its communication coverage range. As a result, an increase in the communication time can lead to impairment of intended user convenience.

For example, communication of a large amount of data through infrared communication typically involves keeping the angle and the distance of the device in a predetermined range that allows communication, and this is a great burden on the user. In the case of NFC communication, since the communication range is quite small, the user often has to maintain the communication objects in contact with each other, which involves a large user load. The reason why NFC communication is employed for ticket gates at transportation systems and electronic payments at convenience stores is that, in many cases, the amount of data transmitted in NFC communication is very small. Thus, the amount of contact time is relatively small, and cases in which the period of time in which the NFC device is held over a reader device becomes an issue rarely occur.

The present invention has been conceived in view of the above-described situation, and it is desirable to provide a novel and improved communication device and communication method which are capable of reducing the amount of communication time by selectively using multiple communicating means having different communication rates in accordance with a data type.

According to one embodiment of the present invention, there is provided a communication device having a first communication section that supports a first communication mode having a low communication rate and a second communication section that supports a second communication mode having a higher communication rate than the first communication mode.

The communication device includes: a packet generation section configured to generate a first portion containing authentication information used for connection authentication for the second communication mode and a second portion other than the first portion; and a communication control section configured to perform control so as to cause the first communication section to transmit the first portion and so as to cause the second communication section to transmit the second portion after the connection authentication succeeds using the authentication information contained in the first portion.

As described above, the communication device has the capability of generating, using the packet generation section, the first portion including authentication information used for connection authentication for the second communication mode and the second portion other than the first portion. That is, the communication device can separate a communication packet into at least authentication information used for the connection authentication for the second mode and information other than the authentication information. Thus, the packet generation section can reconfigure the first packet into a new communication packet. The packet generation section can also reconfigure the second portion into a communication packet for the second communication mode or another communication mode.

This arrangement can reduce the amount of communication data in the first communication mode having a relatively low communication rate. The arrangement also allows the remaining second portion to be transmitted in the second communication mode having a relatively high communication rate.

In addition, the communication device has the capability to perform, using the communication control section, control so as to cause the first communication section to transmit the first portion and to cause the second communication section to transmit the second communication portion after the connection authentication is successfully completed using the authentication information contained in the first portion. Since the first portion generated by the packet generation section has a reduced amount of data, the first portion containing the authentication information is transmitted in a relatively short period of time in the first communication mode. Thereafter, on the basis of the authentication information contained in the first portion, the connection authentication is performed in the second communication mode.

When the connection authentication in the second communication mode is successively completed, it is possible to perform data transfer using the second communication section having a relatively high communication rate. Thus, after the connection authentication in the second communication mode is successively completed, the communication device uses the second communication section to transmit the remaining portion (the second portion) of the communication packet. As described above, the amount of data transmitted in the first communication mode having a relatively low communication rate is minimized and the remaining data is transmitted in the second communication mode having a relatively high communication rate. As a result, it is possible to reduce the overall communication time.

In this case, how to determine data to be contained in the first portion is important, and the communication device is configured so as to contain, in the first portion, at least the authentication information used for the connection authentication using the second communication mode. In general, at least authentication information is required to perform communication in the second communication mode. Thus, separating the authentication information portion from other portions is important for a case in which the first and second communication modes are complementarily used to increase the communication rate. In addition, with the configuration in which the authentication information is contained in the first portion, the communication device performs control processing using the communication control section. Through such a processing procedure, high-rate transmission of communication packets is achieved.

The second portion may contain type information indicating a type of application using the second communication mode and option information used for launching an application indicated by the type information, and the type information and the option information can be used to launch the application. Typically, information of application executed by cooperation of communication devices when option information in also included has a relatively large amount of data, and is thus often not suitable for transmission in the first communication mode having a relatively low communication rate. Accordingly, it is preferred that such information having a large amount of data be contained in the second portion. With this arrangement, data transfer can be completed at a higher rate.

The first portion may further include a list of communication protocols that are usable by the second communication section and a list of option information used for connection authentication for each communication protocol included in the list. When the second communication section supports multiple communication protocols for the second communication mode, it is preferred that the target communication device be presented with choices. In this case, it is preferred that option information used for communication in a communication protocol selected by the target communication device be presented at the same time. With this arrangement, the chances of data transfer using the second communication mode having a relatively high communication rate increases, and it is also possible to more appropriately use a communication protocol in accordance with an application. This leads to an improvement in user convenience.

According to another embodiment of the present invention, there is provided a communication method for a communication device having a first communication section that supports a first communication mode having a low communication rate and a second communication section that supports a second communication mode having a higher communication rate than the first communication mode.

The communication method includes the steps of: generating a first portion containing authentication information used for connection authentication for the second communication mode and a second portion other than the first portion; transmitting the first portion by using the first communication section; performing the connection authentication using the authentication information contained in the first portion; and transmitting the second portion by using the second communication section, after the connection authentication succeeds.

In the packet generating step, a first portion containing authentication information used for connection authentication for the second communication mode and a second portion other than the first portion are generated. That is, in the communication method, a communication packet is separated into at least authentication information used for the connection authentication for the second mode and information other than the authentication information. Thus, in the packet generating step, the first portion is reconfigured into a new communication packet and the second portion is reconfigured into a communication packet for the second communication mode or another communication mode.

This arrangement can reduce the amount of communication data in the first communication mode having a relatively low communication rate. The arrangement also allows the remaining second portion to be transmitted in the second communication mode having a relatively high communication rate.

Furthermore, in the communication method, the first communication section transmits the first portion in the first-portion transmitting step, and after the connection authentication is successfully completed in the connection-authentication performing step using the authentication information contained in the first portion, the second communication section transmits the second communication portion. Since the first portion generated in the packet generating step has a reduced amount of data, the first portion containing the authentication information is transmitted in a relatively short period of time in the first communication mode. Thereafter, on the basis of the authentication information contained in the first portion, the connection authentication is performed in the second communication mode.

When the connection authentication in the second communication mode is successively completed, it is possible to perform data transfer using the second communication section having a relatively high communication rate. Thus, in the communication method, after the connection authentication in the second communication mode is successively completed, the second communication section is used to transmit the remaining portion (the second portion) of the communication packet. As described above, the amount of data transmitted in the first communication mode having a relatively low communication rate is minimized and the remaining data is transmitted in the second communication mode having a relatively high communication rate. As a result, the overall communication time is reduced.

In this case, how to determine data to be contained in the first portion is important, and in the communication method, at least the authentication information used for the connection authentication using the second communication mode is contained in the first portion. In general, at least authentication information is required to perform communication in the second communication mode. Thus, separating the authentication portion from other portions is important for a case in which the first and second communication portions are used in a complementary manner to increase the communication rate. Through such a processing procedure, high-rate transmission of communication packets is achieved.

As described above, according to the present invention, the multiple communication means having communication rates that are different from each other are selectively used in accordance with the type of data. Thus, it is possible to reduce the communication time.

DESCRIPTION OF THE PREFERRED EMBODIMENTS

Figure 1:
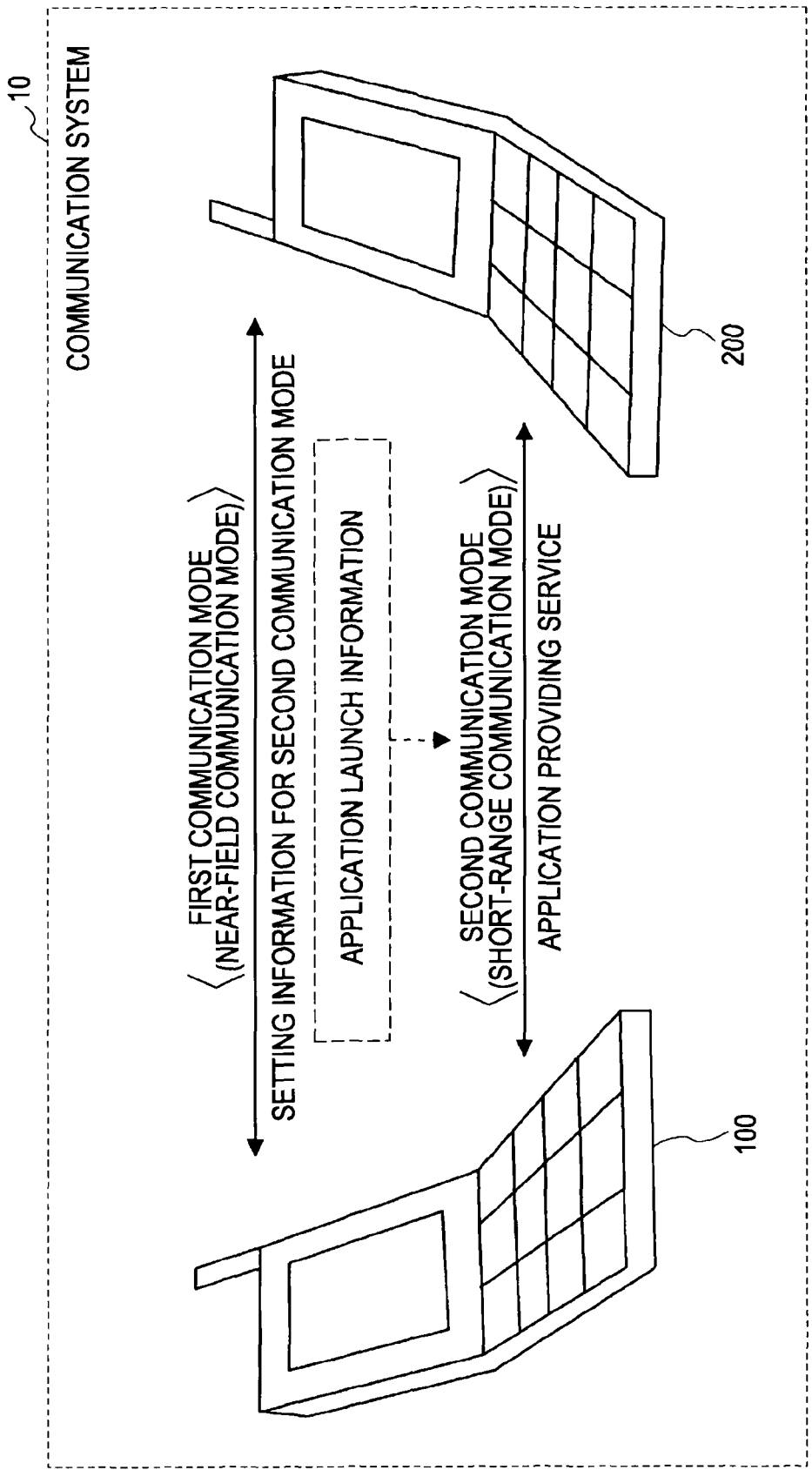
FIG. 1 is a diagram illustrating an example of the configuration of a communication system according to one embodiment of the present invention.

Preferred embodiments of the present invention will be described below in detail with reference to the accompanying drawings. Elements having substantially the same functional configurations are denoted by the same reference numbers and redundant descriptions thereof are not given herein and in the drawings.

First Embodiment

A first embodiment of the present invention will first be described. An overall flow of applications according to the embodiment will first be described below. A technology in which switching from a first communication mode to a second communication mode triggers the launch of an application while synchronization with a target communication device (a device with which communication is to be performed) is maintained is also described below.

Thereafter, descriptions are given of functional configurations of communication devices 100 and 200 according to the embodiment of the present invention, and then, the flow of connection authentication processing through the second communication mode. A description is also given of the structure of an NFC communication packet defined by an NFC forum. A description is further given of a method for storing authentication information and a method for launching an application after authentication.

The present embodiment features a technology in which information to be transmitted in an NFC communication mode, of information used for authentication processing to application-launch processing, is divided into appropriate units and information to be transmitted in the NFC communication mode and information to be transmitted in another communication mode are distinguished therebetween to selectively switch a communication mode used. In particular, the present embodiment minimizes information transmitted in the NFC communication mode to enhance the overall communication efficiency. A packet configuration, a packet dividing method, and the flow of transmission and reception processing including negotiation (mediation for a communication mode) with a target communication device, which are capable of achieving the above-described features, will be described below in detail.

[Example of System Configuration of Communication System 10]

One example of the configuration of a communication system 10 according to the present embodiment of the present invention will now be described with reference to FIG. 1. FIG. 1 is a diagram illustrating a functional configuration of the communication system 10 according to the present embodiment.

As shown in FIG. 1, the communication system 10 includes two communication devices 100 and 200. These communication devices 100 and 200 are configured to be capable of communicating with each other in two different types of communication mode. The communication devices 100 and 200 are operable in cooperation with each other to configure the communication system 10 that is capable of launching an application for providing a series of services.

One of the modes (a first communication mode) is a near-field communication mode (hereinafter referred to as an "NFC mode"). The NFC mode is a communication mode in which communication is performed over a very short distance, such as about 10 cm, and is the so-called "contactless communication". The communication mode is realized by, for example, wireless communication utilizing electromagnetic induction, as in contactless IC (integrated circuit) cards. On the other hand, the other communication mode (a second communication mode) is a mode in which communication can be performed over a longer distance than in the first communication mode. The first communication mode may use an infrared communication system.

The second communication mode has a wider frequency band than the first communication mode and enables communication at relatively high rate. The second communication mode uses, for example, a Bluetooth (BT) communication system or a WLAN communication system (IEEE [Institute of Electrical and Electronics Engineers] 802.11x).

In the first communication mode, typically, setting information for the second communication mode and information used for launching an application are often communicated. On the other hand, in the second communication mode, information used for causing respective applications, executed by the communication device 100 and the communication device 200, to run in a cooperated manner and information used for a series of services (application-providing services) are often communicated.

In general, the use of the first communication mode makes it easier to locate a target communication device, because of a physical limitation of the range of communication, and correspondingly, makes it easier to perform a configuration task for establishing a communication link. In the second communication mode, on the other hand, when multiple devices are present in a communication coverage range, the user usually has to specify a target communication device. Thus, in the case of the first communication mode, when the user brings a user-operated device (a local device) into close proximity to a particular target communication device, the number of target communication devices is in many cases limited to one. Thus, the user does not have to manually input information for specifying the target communication device and so on.

The first communication mode, however, is relatively low in data transfer rate and is often not suitable for transferring a large amount of data. Typically, the first communication mode also has a limitation in that both devices have to be located close to each other during communication. It may, however, be difficult for the user to keep the devices close to each other and it may be difficult to maintain the predetermined positional relationship between the devices. Moreover, it is often difficult to have three or more devices to be within a predetermined communication range for mutual communication.

In view of the above-described shortcomings, the communication system 10 is designed so that the second communication mode is used for application execution processing performed by cooperation of the communication devices 100 and 200 and the first communication mode is only used for exchange of the setting information for the second communication mode and application launch information. That is, the communication devices 100 and 200 initially exchange the setting information for the second communication mode with each other, establish a communication for the second communication mode on the basis of the setting information, and then perform a cooperated operation of the applications by using the second communication mode.

In this case, by using the first communication mode, the communication devices 100 and 200 can exchange their application launch information as well as the setting information for the second communication mode. Thus, on the basis of the application information of the communication device at the other end of communication, each of the communication devices 100 and 200 can select an application to be used. Such application-information exchange allows the communication devices 100 and 200 to appropriately perform communication setting and application setting without an increase in the user's work load and also allows for an improvement in user convenience during application execution that involves communication between the devices.

The communication devices 100 and 200 included in the communication system 10 may take any form of communication device that can perform communication in both the first communication mode and the second communication mode. The communication devices 100 and 200 may be, for example, a television signal receiver, a video recorder, a media player, an audio amplifier, an audio system, a printer, a facsimile machine, an in-vehicle audio system, a vehicle navigation system, and so on.

Needless to say, the present embodiment is not limited to these examples. For example, the communication system 10 may include a mobile phone and an audio system. In such a manner, the communication devices 100 and 200 may have functions that are different from each other. Additionally, the communication system 10 may include any number of communication devices, and thus may include three or more communication devices. For convenience of description, a case in which the communication system 10 includes one communication device 100 and one communication device 200 will be discussed below.

[Functional Configuration of Communication Devices 100 and 200]

Figure 2:
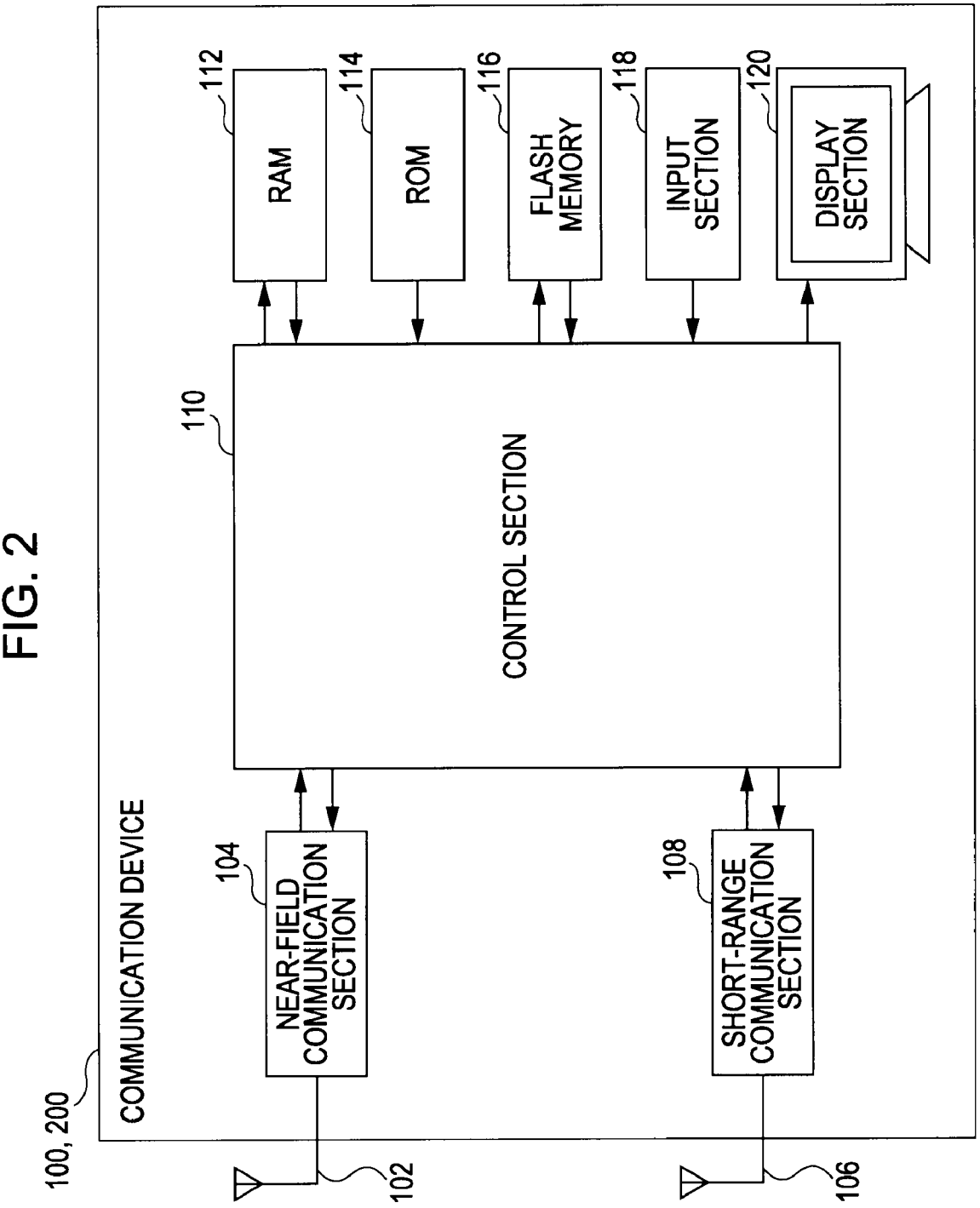
FIG. 2 is a diagram illustrating a functional configuration of a communication device according to the embodiment.

A functional configuration of the communication devices 100 and 200 according to the present embodiment of the present invention will now be described with reference to FIG. 2. FIG. 2 is a diagram illustrating a functional configuration of the communication devices 100 and 200 according to the present embodiment.

As shown in FIG. 2, each of the communication devices 100 and 200 generally includes antennas 102 and 106, a near-field communication section 104, a short-range communication section 108, a control section 110, a RAM (random access memory) 112, a ROM (read only memory) 114, a flash memory 116, an input section 118, and a display section 120.

Figure 14:
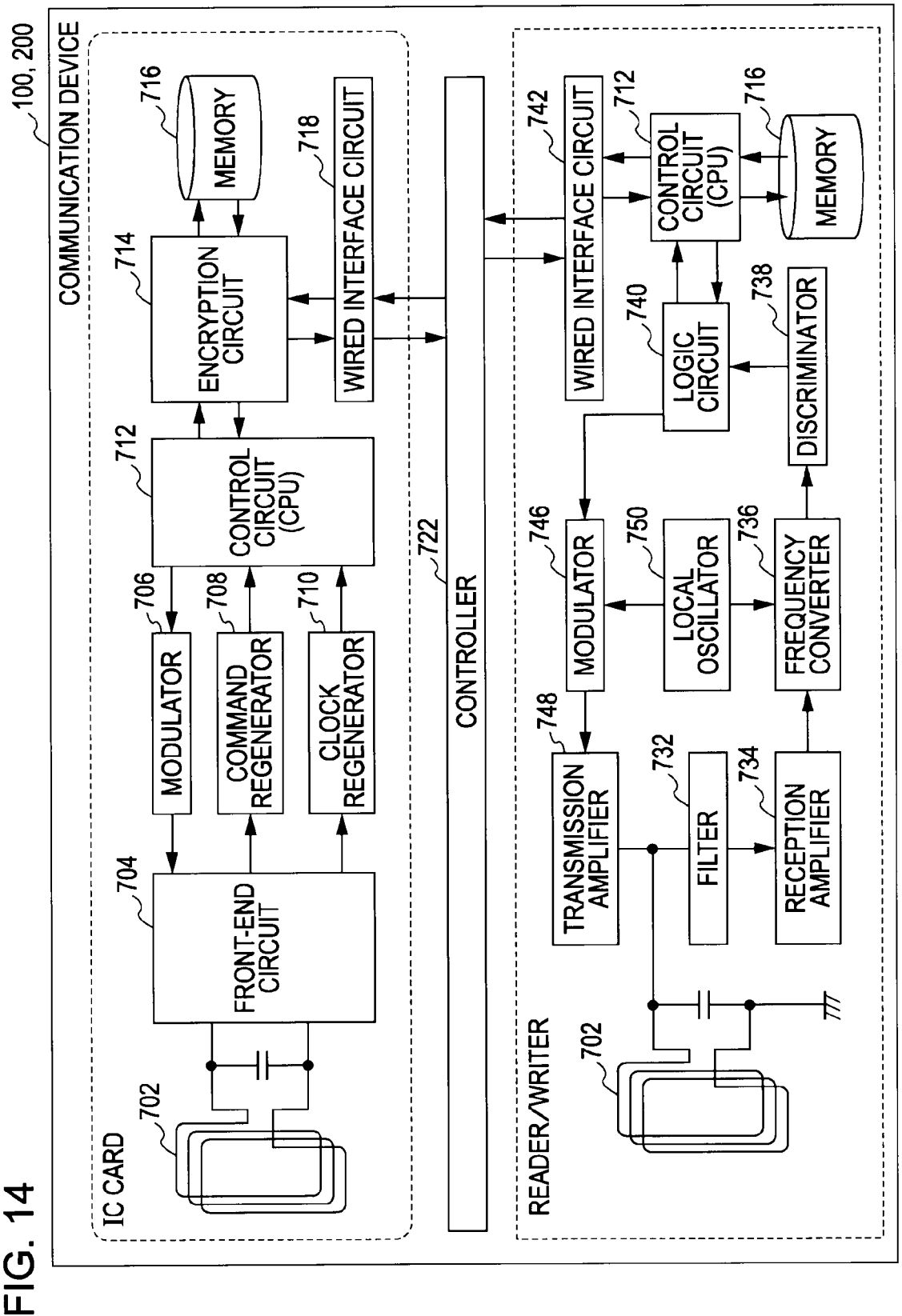
FIG. 14 is a diagram illustrating an example of the hardware configuration of the communication device according to the embodiment.

The antenna 102 and the near-field communication section 104 are implemented by some or all of elements included in an IC card or a reader/writer of hardware resources shown in FIG. 14. The antenna 106 and the short-range communication section 108 are implemented by, for example, a communication section 926 of hardware resources shown in FIG. 15. The function of the control section 110 is implemented by, for example, a control circuit 712, a controller 722, or a CPU (central processing unit) 902.

(Near-Field Communication Section 104)

The near-field communication section 104 is connected to the antenna 102 and can transmit/receive data in accordance with the first communication mode (the NFC mode). The near-field communication section 104 utilizes a frequency band of, for example, 13.56 MHz to enable communication at a communication rate of up to 424 Kbit/s over a very short distance, such as about 10 cm. The communication distance, the communication rate, and the frequency band of the near-field communication section 104 are not limited to the aforementioned examples and can be arbitrarily set.

(Short-Range Communication Section 108)

The short-range communication section 108 serves as communicating means that is capable of performing communication over a longer distance than that of the near-field communication section 104. The short-range communication section 108 is connected to the antenna 106, and can transmit/receive data at high rate by utilizing a wider bandwidth than the near-field communication section 104. Multiple short-range communication sections 108 may be provided for respective protocols used in the second communication mode. That is, the communication devices 100 and 200 may be configured so as to support multiple types of second communication mode.

For example, the short-range communication section 108 supports BT as the second communication mode so that it can perform communication at a communication rate of up to 3 Mbit/s by utilizing a communication band of 2.4 GHz. The communication band and the communication rate may be not only those specified by BT Core Specification version 2.0+ EDR but also its later versions and other standards, and can be changed according to the type of application, as appropriate. In addition, the short-range communication section 108 may support, for example, a WLAN for the second communication mode. In this case, the short-range communication section 108 can perform communication at up to about 100 Mbit/s based on WLAN 802.11n.

(Control Section 110)

The control section 110 serves as means for controlling the elements in each of the communication devices 100 and 200. The control section 110 generally has a boundary determining function, a message dividing function, a packet reconfiguring function, and a packet-characteristic determining function. The control section 110 uses these functions to control, for example, message division processing and divided-packet transmission, which are described below in detail.

The boundary determining function is a function for determining a boundary portion at which a handover message is to be divided, during handover-message division processing described below. The message dividing function is a function for dividing a handover message at the boundary portion determined by the boundary determining function. The packet reconfiguring function is a function for configuring a communication packet for the first communication mode, the communication packet containing a first-half portion of the divided handover messages.

The packet reconfiguring function includes a function for adding, to an end of a divided handover message, a flag indicating whether or not the handover message is divided and information regarding the second communication mode. The packet-characteristic determining function is a function for determining whether or not a communication packet in the first communication mode is divided and whether or not the transmission source of the communication packet supports a protocol for the second communication mode.

(Other Configurations)

The RAM 112 is used as, for example, a stack area or a heap area when the control section 110 performs computation processing. The ROM 114 stores, for example, executable binary code for a program for realizing the function of the control section 110. Alternatively, the binary code for the program for realizing the function of the control section 110 may be stored in the flash memory 116.

[Authentication Method Based on OOB]

Now, a description will be briefly given of an authentication method relating to Out-Of-Band (OOB) in a Secure Simple Pairing (SSP) authentication scheme defined by BT Core Specification version 2.1 proposed by the BT SIG (Bluetooth Special Interest Group).

[Authentication Method Based OOB]

An authentication method for the OOB will now be described. The OOB is one example of SSP authentication. During the processing, when the communication devices 100 and 200 are located close to each other, they execute NFC communication by using the near-field communication sections 104 and then execute authentication processing via BT by using the short-range communication sections 108. Reference is made to Supplement 1 for details of the SSP authentication processing.

First, when the communication devices 100 and 200 are located sufficiently close to each other to reach a range that enables communication using NFC communication, setting information (BD addresses, commitments, and so on) is exchanged via the near-field communication sections 104 (step 1). Next, public keys (PKa and PKb) are mutually exchanged on the basis of the BD addresses contained in the setting information (step 2). At this point, the control section 110 generates a shared key (DHKey) on the basis of the obtained public keys (PKb, PKa) and secret keys (SKa, SKb) of the local device (step 3).

Figure 18:
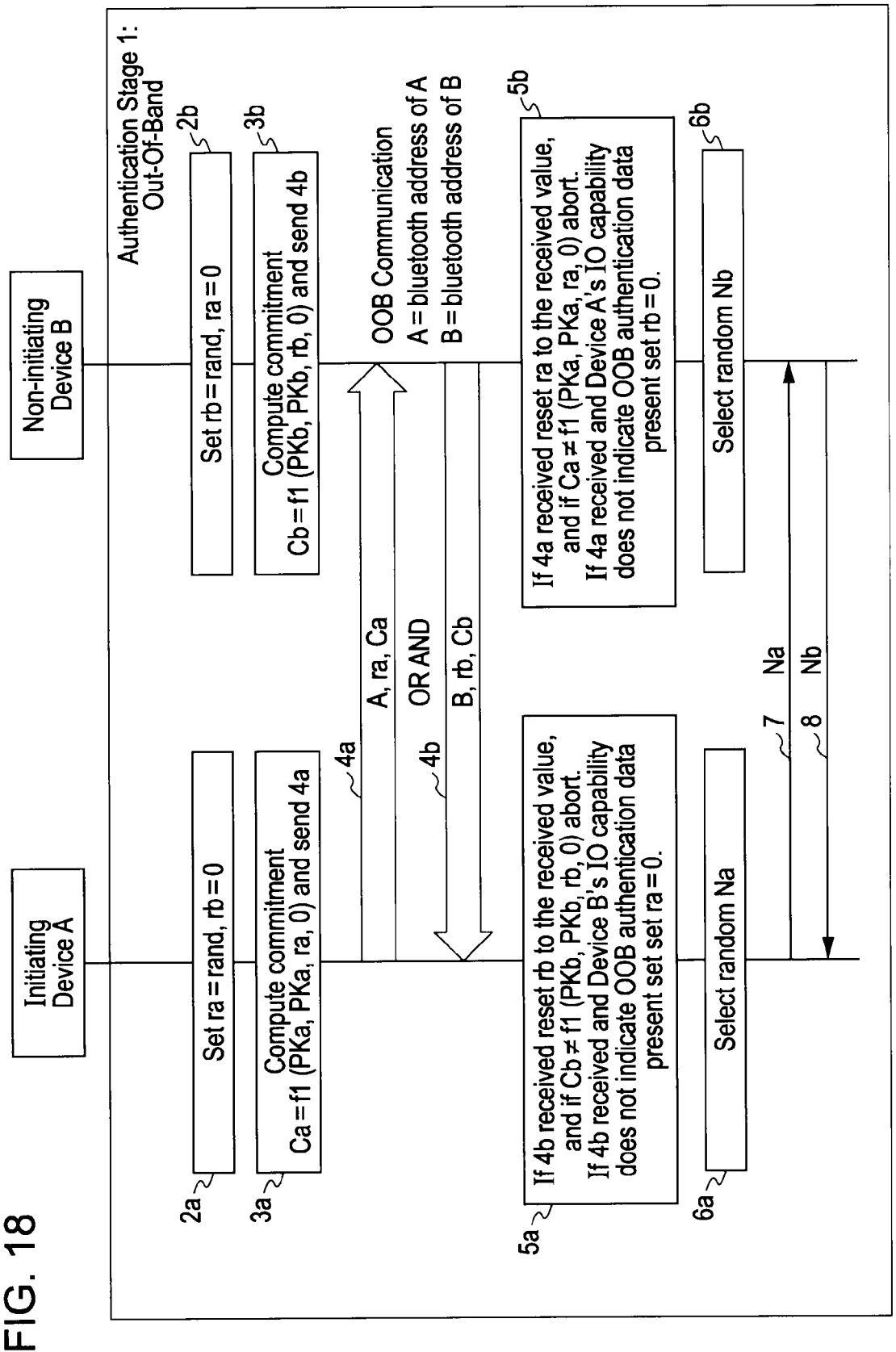
FIG. 18 is a flow diagram illustrating the flow of anther authentication processing method for BT devices.
Figure 19:
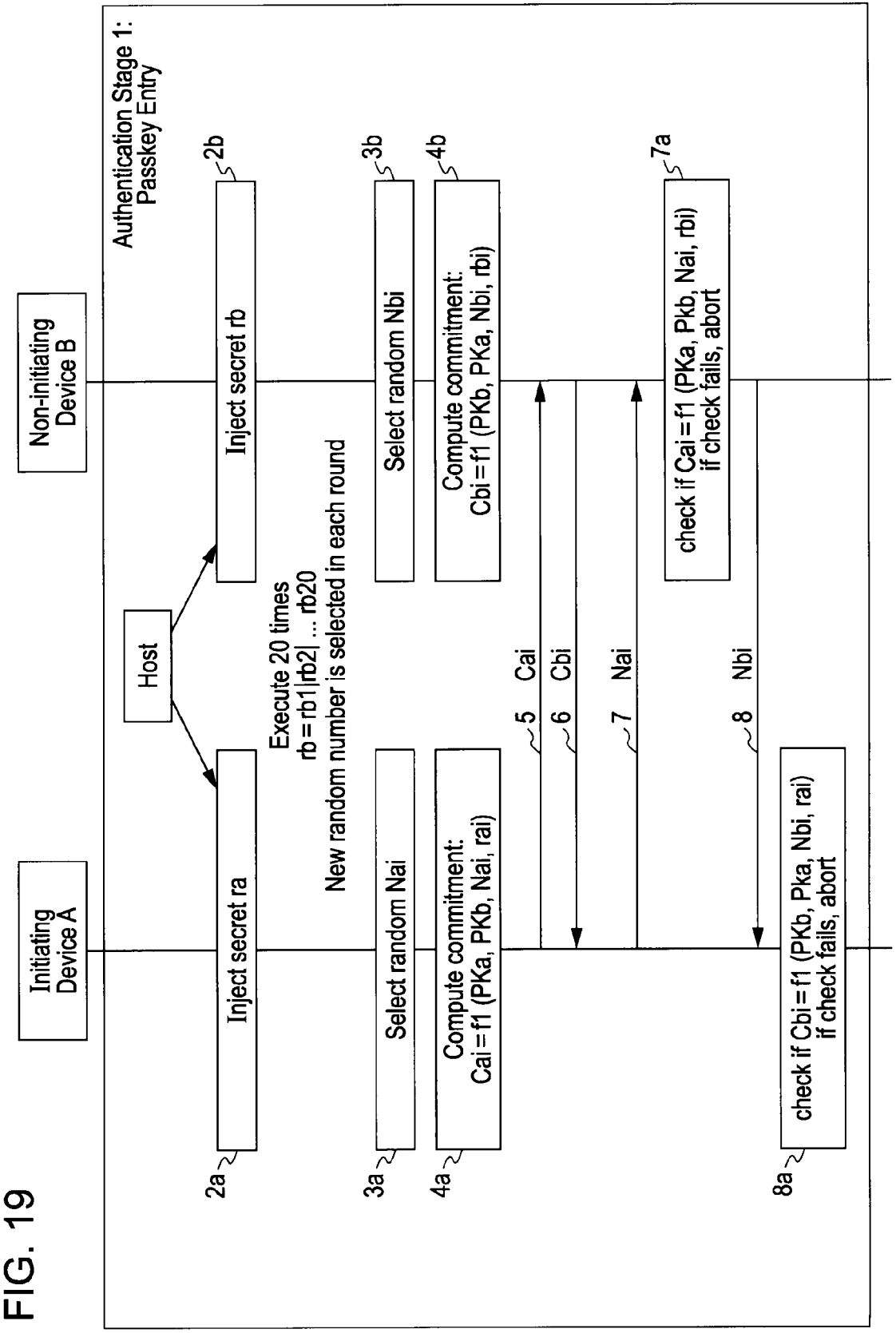
FIG. 19 is a flow diagram illustrating the flow of yet another authentication processing method for BT devices.

Next, the communication devices 100 and 200 execute first authentication processing (which corresponds to authentication processing shown in FIG. 18) by using random numbers (ra, rb) contained in the received setting information and commitments (Ca, Cb) (step 4). For the first authentication processing shown in FIG. 18, since the public keys are used to issue the commitments, the processing is based on the premise that the public keys are exchanged before the start of the NFC communication. The present embodiment of the present invention is also applicable to such a scheme.

When the first authentication processing is successfully completed, the control sections 110 in the communication devices 100 and 200 generate random numbers (Na, Nb) and exchange the random numbers via the short-range communication sections 108. Through the use of the shared key (DH-Key), the obtained random numbers (Na, Nb, ra, rb), BD addresses, and so on, the control sections 110 determine confirmation values (Ea, Eb) on the basis of a predetermined authentication function (f3).

Figure 16A:
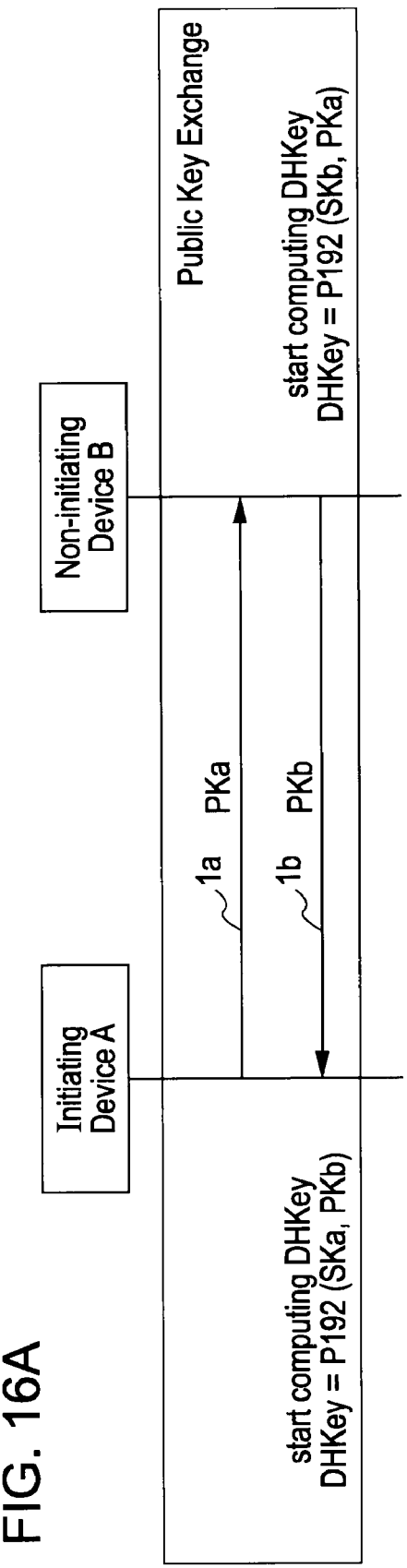
FIGS. 16A and 16B are flow diagrams each illustrating the flow of an authentication processing method for BT devices.
Figure 16B:
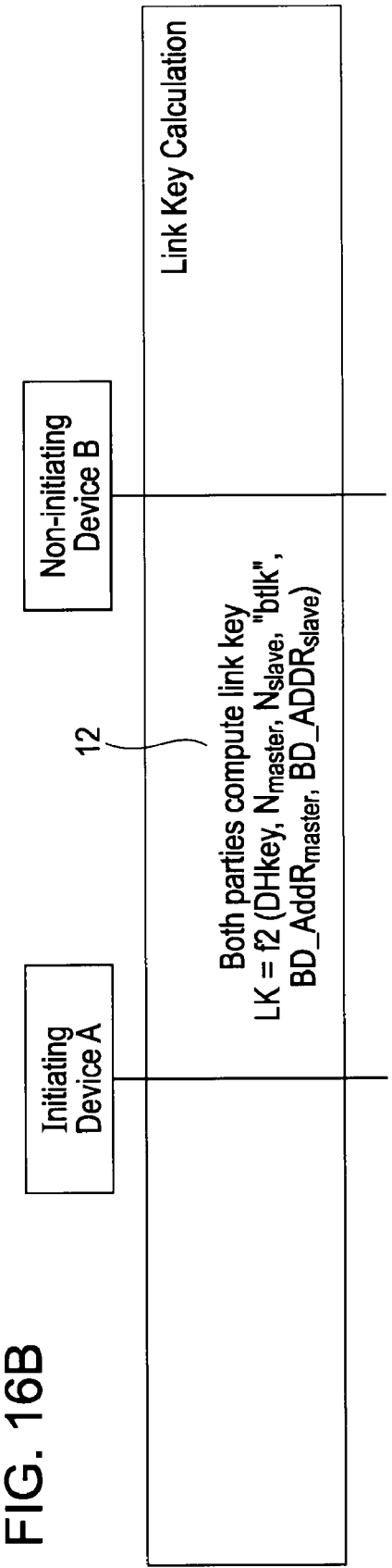
Figure 17:
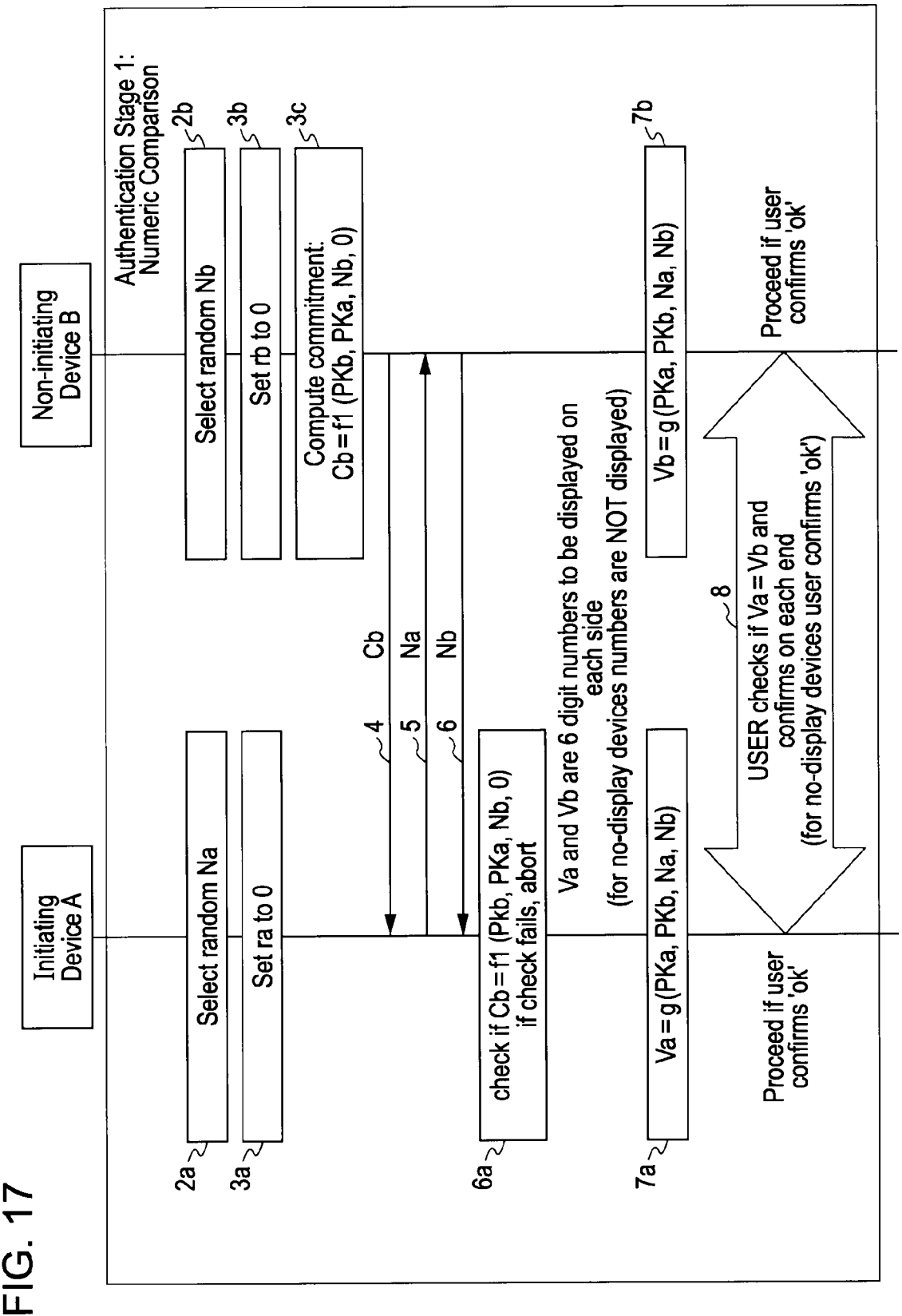
FIG. 17 is a flow diagram illustrating the flow of another authentication processing method for BT devices.
Figure 20:
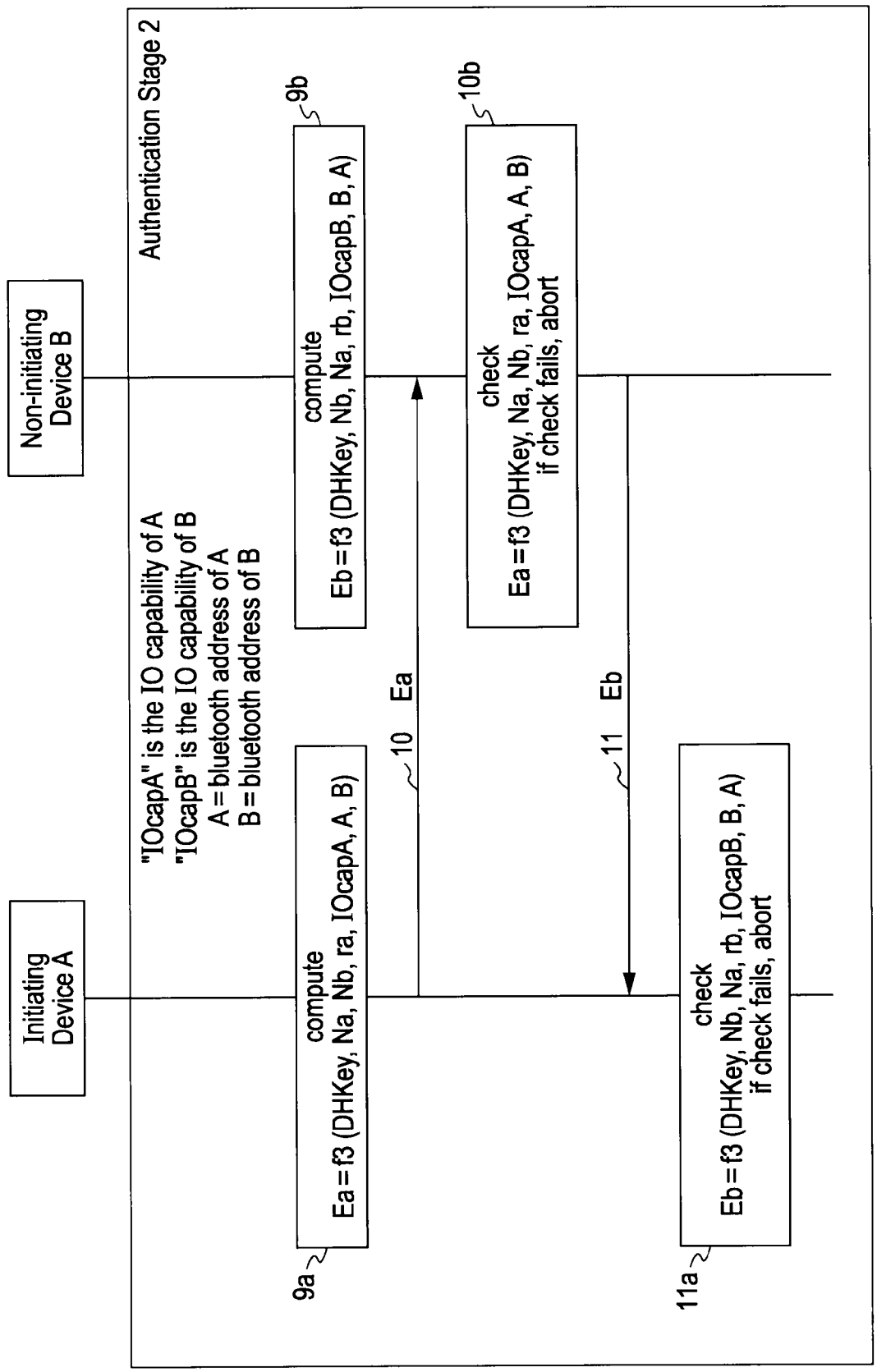
FIG. 20 is a flow diagram illustrating the flow of the authentication processing method for the BT devices.

The communication devices 100 and 200 exchange the confirmation values (Ea, Eb) to execute second authentication processing (step 5, which corresponds to authentication processing shown in FIG. 20). Next, the control sections 110 in the communication devices 100 and 200 compute a link key (LK) (step 6; refer to FIG. 16B).

[Authentication Method Based on WPS]

An authentication method specified by Wi-Fi Protected Setup (WPS) Specification version 1.0h specified by the Wi-Fi Alliance will now be briefly described. Of some authentication schemes specified by the specification, OOB using an NFC communication device will now be briefly described. Reference is made to Supplement 2 for details of the WPS authentication processing.

First, two types of packets are transmitted in NFC communication. One of the packets is an OOB device password and the other is a credential. The OOB device password includes a device password corresponding to a 32-byte public key specified by the WPS specification, a 20-byte hash value for the credential, and so on.

This packet is exchanged between a device (enrollee) wishing to join the network and a registrar. In this case, setting information is securely exchanged in a 2.4 GHz band over a network channel encrypted using a Diffie-Hellman Key exchange scheme. Thereafter, the enrollee is added to the network.

On the other hand, the credential stores unencrypted information, such as an SSID (service set identifier) used for network setting and a network key indicating a cryptographic key for a transmission channel. A description will now be given of a case in which a device (enrollee) that wishes to join an access point (AP) that does not support the WPS. In this case, if the enrollee supports the NFC communication and an NFC-enabled card-type token specifies setting information of the AP, the enrollee can connect to a network by reading network setting information from the token.

[Example of Structure of NFC Communication Packet]

Figure 3:
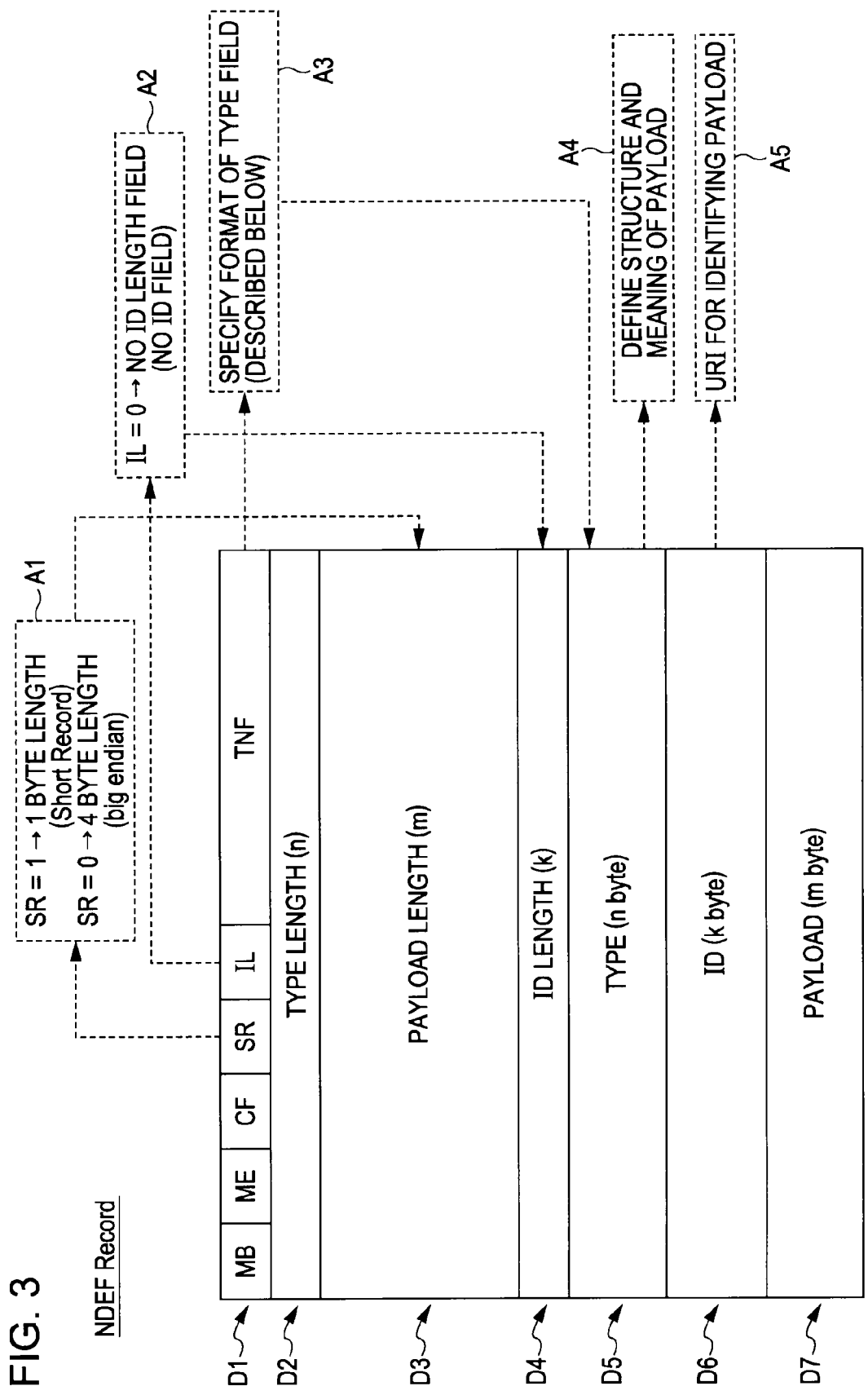
FIG. 3 is a diagram illustrating an example of the configuration of a communication packet according to the embodiment.

Next, an example of the configuration of a communication packet for use in the NFC communication will now be described with reference to FIG. 3. FIG. 3 is a diagram illustrating an example of the structure of a communication packet for use in the NFC communication.

The NFC communication is performed according to an NFC Data Exchange Format (NDEF) defined by the NFC forum. A packet in the NFC communication has a unit called an NDEF record as shown in FIG. 3. The NDEF record generally has a "record type" field D5, a "record ID" field D6, and a "payload" field D7.

A first field D1 of the NDEF record contains an identifier MB indicating whether or not the record is the start of a message and an identifier ME indicating the end of the message. The first field D1 further contains an identifier SR (A1) indicating whether the data length of the "payload" field D7 is 1 byte or 4 bytes.

The first field D1 further contains an identifier IL (A2) indicating the presence/absence of the "record ID" field D6 and an identifier TNF (A3) specifying a format of the "record type" field D5. "Header" fields D2, D3, and D4 of the NDEF record store the data lengths of the "record type" field D5, the "record ID" field D6, and the "payload" field D7, respectively.

The "record type" field D5 is used as an identifier for data stored in the "payload" field D7. The "record type" field D5 is thus referred to during identification of the format of data stored in the "payload" field D7. For example, the "record type" field D5 defines the structure and the meaning of the "payload" field D5 (as indicated by A4).

The "record ID" field D6 stores a URI (uniform resource identifier) for identifying payload (as indicated by AS). The definition of the record type may be specified by the NFC forum or may be uniquely specified by a user.

Figure 4:
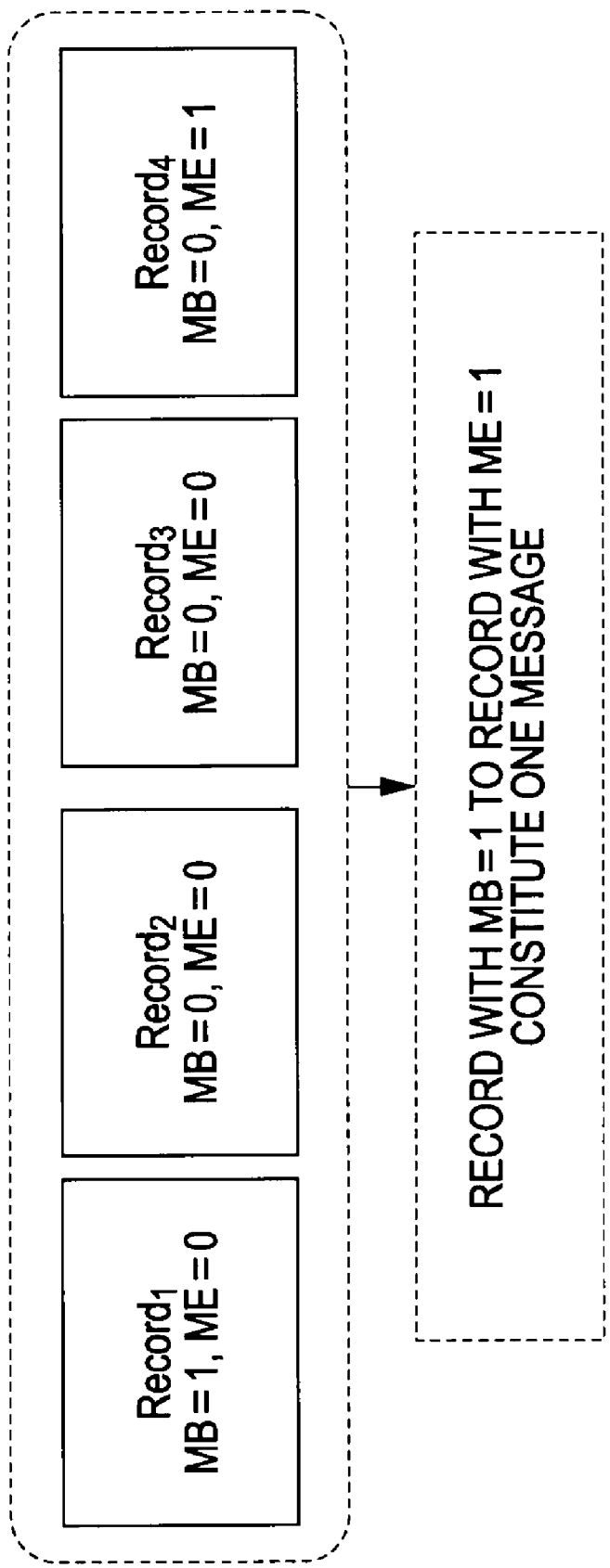
FIG. 4 is a diagram illustrating an example of the configuration of the communication packet according to the embodiment.

A description will now be given with reference to FIG. 4. FIG. 4 is a diagram illustrating an example of the layout of an NDEF message. The NDEF message is a set of the NDEF records shown in FIG. 3. A record with an identifier MB=1 to a record with an identifier ME=1, the identifiers being contained in the first fields D1 of the NDEF records, constitute one NDEF message.

[Example of Layout of Handover Message]

Figure 5:
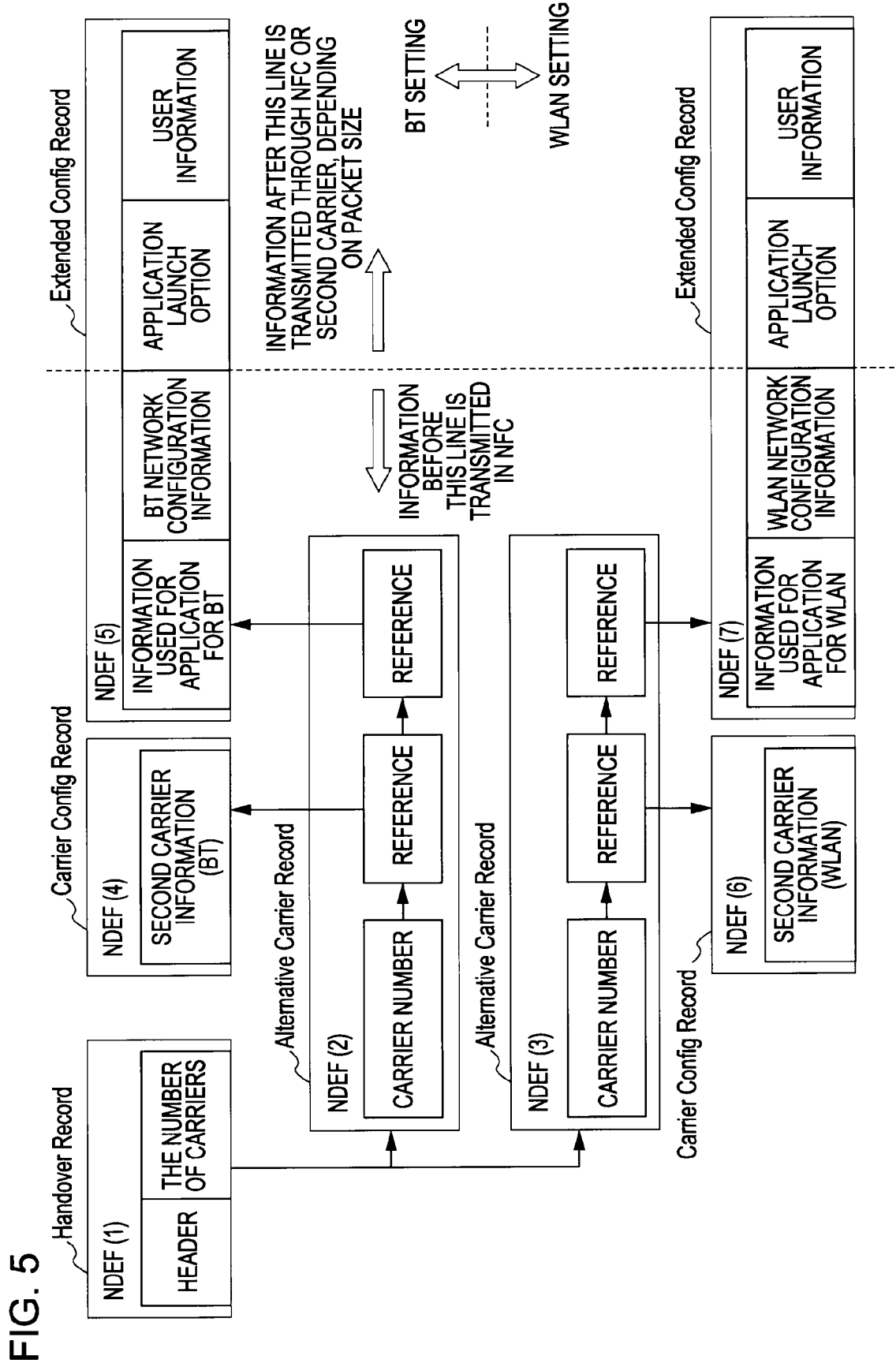
FIG. 5 is a diagram illustrating an example of the configuration of the communication packet according to the embodiment.

A specific layout of a handover message according to the present embodiment of the present invention will now be described with reference to FIG. 5. FIG. 5 is a diagram illustrating a specific layout of a handover message according to the present embodiment. Although multiple communication devices that support the second communication mode may be present, a description in this case will be given of a case in which one communication device (having the short-range communication section 108) that supports two communication modes (BT and WLAN) is present.

A first NDEF record (NDEF(1)) that serves as a header field stores a handover record type indicating that the NDEF message is a message for handover. More specifically, the record type states an Hq (Handover Request) indicating that the NDEF message is a message for handover request or an Hs (Handover Select) indicating that the NDEF message is a response message for a request. The number of NDEF communication packets in the handover message which follow the NDEF (1) is stored in the payload.

Alternative carrier records (ACRs), which are NDEF communication packets that follow the NDEF (1), are present according to the number of packets indicated by the NDEF (1). The payload of the ACR stores information, such as the type of local device and the startup state (power ON/OFF) thereof, and a destination to which reference is made for detailed setting information.

In the NDEF (2), the type record states "bluetooth.org.sp" indicating that this packet contains connection information for a BT device (hereinafter referred to as "BD"). The payload in the NDEF (2) further stores two reference pointers to detailed information (NDEF(4)) and NDEF(5)).

Similarly, the record type in the NDEF (3) states "application/vnd.wfa.wsc" indicating that this packet contains connection information for a WLAN device. The payload in the NDEF (3) further stores two reference pointers to detailed information (NDEF(6)) and NDEF(7)).

Next, the payloads of the NDEF communication packets in which parameters for communication modes are stored will be described in more detail.

The NDEF (4) and the NDEF (6) state respective minimum information for authentication processing specified by the standards (BT and WLAN) for the second communication mode. Specifically, the NDEF (4) stores a BD address, a hash value (16 bytes), and a randomizer (16 bytes) used for BT OOB authentication. On the other hand, the NDEF (6) stores information, such as an encryption type, an authentication type, a network key, a MAC address, and an SSID. The SSID is WPS credential information used for WPS authentication.

The NDEF (5) stores information (e.g., an application name to be launched, a profile name to be used, and a message to be shown to the user before the launch) used for launching an application after the BT authentication, network configuration information (e.g., master/slave designation in a piconet), option information used after the launch of the application, and profile information that provides user information.

Similarly, the NDEF (6) stores information (which is not specified by the WPS specification) for launching an application after WLAN authentication. Examples of the information include the name of an application to be launched, a DLNA (digital living network alliance) protocol used or the like, and a message shown to the user before the application launch. In addition, the NDEF (6) stores network configuration information (e.g., information indicating whether the network is in an infrastructure mode or an ad-hoc mode, and the IP address of the local device if it is allocated), option information (e.g., HTML text data that stating a target-device search method using UPnP connection), and profile information that provides user information.

[Example of Handover Message Dividing Method]

As described above, the NDEF message stores various types of information. As described, in the elements of each of the NDEF (5) and NDEF (6), the first-half portion of the NDEF communication packet contains a majority of portions used before the authentication. In addition, the last-half portion of the NDEF communication packet contains a majority of information that may be exchanged after the authentication. Accordingly, in the present embodiment, the control section 110 manages a boundary between the first-half portion and the last-half portion.

Specifically, the control section 110 generates a first-half portion containing authentication information used for connection authentication for the second communication mode and a second-half portion other than the first-half portion, as follows. The control section 110 first divides the NDEF message into two portions on the basis of the boundary. The control section 110 then reconfigures, as a new NDEF communication packet, the handover message contained in the first-half portion before the boundary. The control section 110 further inserts information regarding the second communication mode into the end of the message of the newly reconfigured NDEF communication packet. For example, the control section 110 adds, as information regarding the second communication mode, a flag indicating whether or not the remaining divided portion is to be transmitted as a subsequent packet, information indicating protocol types of the second communication mode, and parameters used for the protocols.

In the case of BT, examples of the protocol types of the second communication mode include various profiles, such as Object Push Profile (OPP), Serial Port Profile (SPP), File Transfer Profile (FTP), Personal Area Networking Profile, and LAN Access Profile (LAP). On the other hand, in the case of WLAN, examples of the protocol types of the second communication mode include a socket communication protocol and FTP. For example, in the case of socket communication, the parameters used for the protocol include an IP address, a port number, and so on. For example, in the case of FTP, the parameters used for the protocol include an IP address, an FTP user name, and an FTP password.

(Specific Example: Classification into First Half Portion and Last Half Portion)

Figure 6:
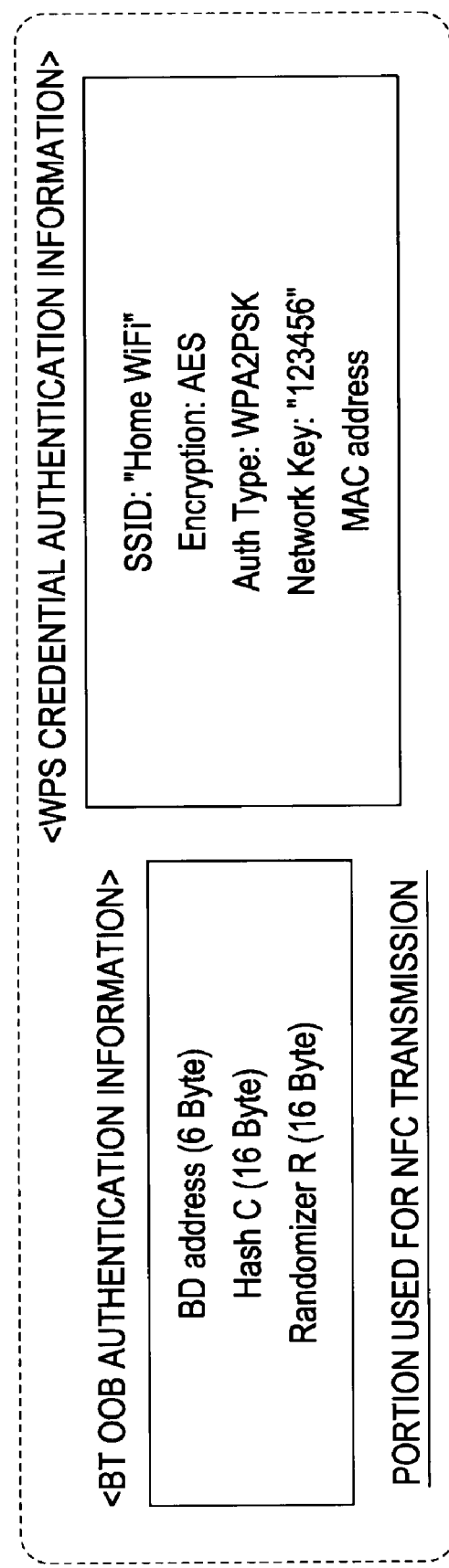
FIG. 6 is a diagram illustrating one example of a communication-packet dividing method according to the embodiment.
Figure 7:
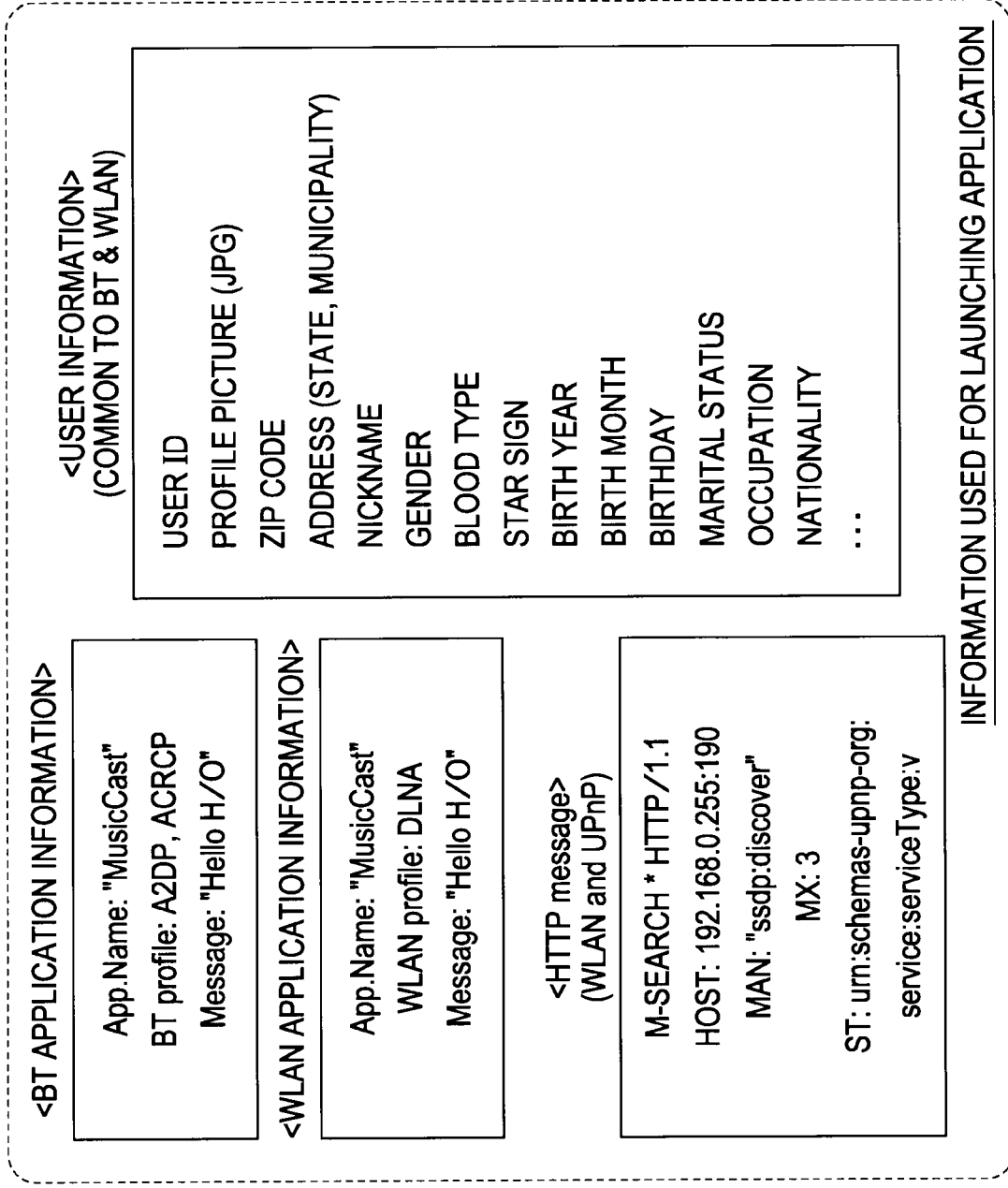
FIG. 7 illustrates one example of the communication-packet dividing method according to the embodiment.

FIG. 6 shows a specific example of the first-half portion of the NDEF messages divided by the control section 110 and FIG. 7 shows a specific example of the last-half portion thereof.

First, a description will be given with reference to FIG. 6. As shown in FIG. 6, the first-half portion transmitted in the NFC communication (the first communication mode) includes, for example, BT OOB authentication information and WPS credential authentication information. The BT OOB authentication information contains information of a BD address, a hash value, a randomizer, and so on. On the other hand, the WPS credential authentication information contains information of a network SSID, an encryption type, an authentication type, a network key, a MAC address, and so on. These pieces of information are used for authentication processing for the second communication mode and so on and are used for establishing a communication channel used in the second communication mode.

A description will be given next with reference to FIG. 7. As shown in FIG. 7, the last-half portion that does not have to be transmitted in the NFC communication (the first communication mode) contains BT or WLAN application information, an HTTP message, a user information, and so on The BT or WLAN application information contains an application name, profile information, a message, and so on. The HTTP message contains profile information regarding a device search method and so on. The user information contains user profile information. These pieces of information do not necessarily have to be used to establish a communication channel for the second communication mode. The data size of the information increases as the number of corresponding application types and protocol types increases, and thus is not suitable for communication in the first communication mode.

(Transmission Method)

Figure 8:
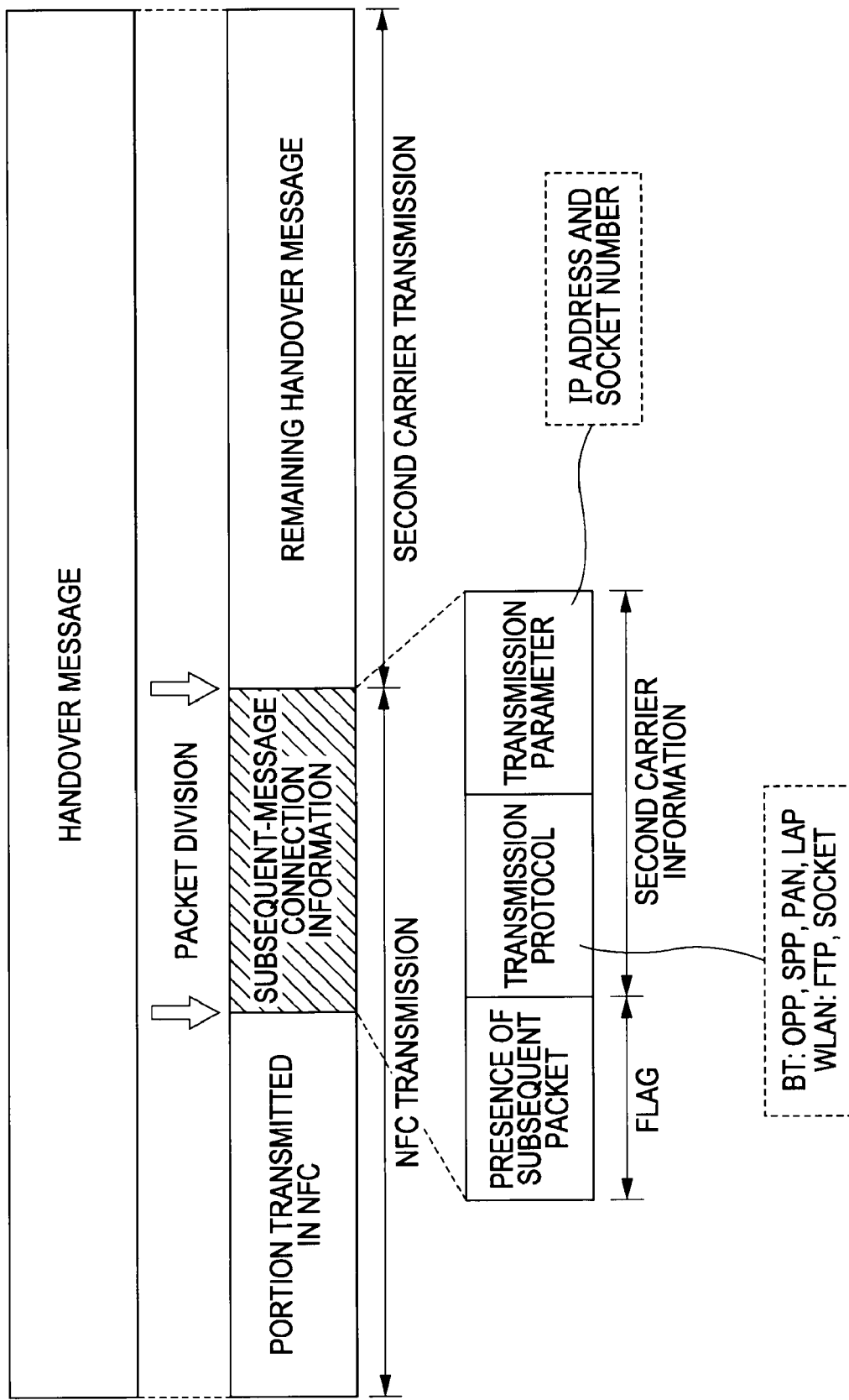
FIG. 8 illustrates one example of the communication-packet dividing method according to the embodiment.

A method for transmitting a handover message according to the present embodiment of the present invention will now be described with reference to FIG. 8. FIG. 8 is a diagram illustrating a method for transmitting a handover message according to the present embodiment.

As described above, the handover message is divided by the control section 110 into a first-half portion to be transmitted in the NFC communication and a last-half portion. The handover message further contains, at a portion connecting the first-half portion and the last-half portion, a flag indicating the presence/absence of the message of the divided last-half portion, a second-communication-mode protocol used for transmitting the last-half portion, and transmission parameters. The connecting portion is added to the end of the first-half portion by the control section 110. The control section 110 then reconfigures, as an NFC communication packet, the first-half portion containing the connecting portion, and reconfigures, as a communication packet for the second communication mode, the last-half portion.

The NFC communication packet corresponding to the first-half portion is transmitted from the near-field communication section 104 to the target communication device. The target communication device then extracts the authentication information contained in the NFC communication packet, and executes authentication processing using the authentication information to establish a transmission channel in the second communication mode. Thereafter, the second-communication-mode communication packet corresponding to the last-half portion is transmitted from the short-range communication section 108 to the target communication device, and a desired application starts providing a service.

(Transmission Procedure of Divided Packet)

Figure 9:
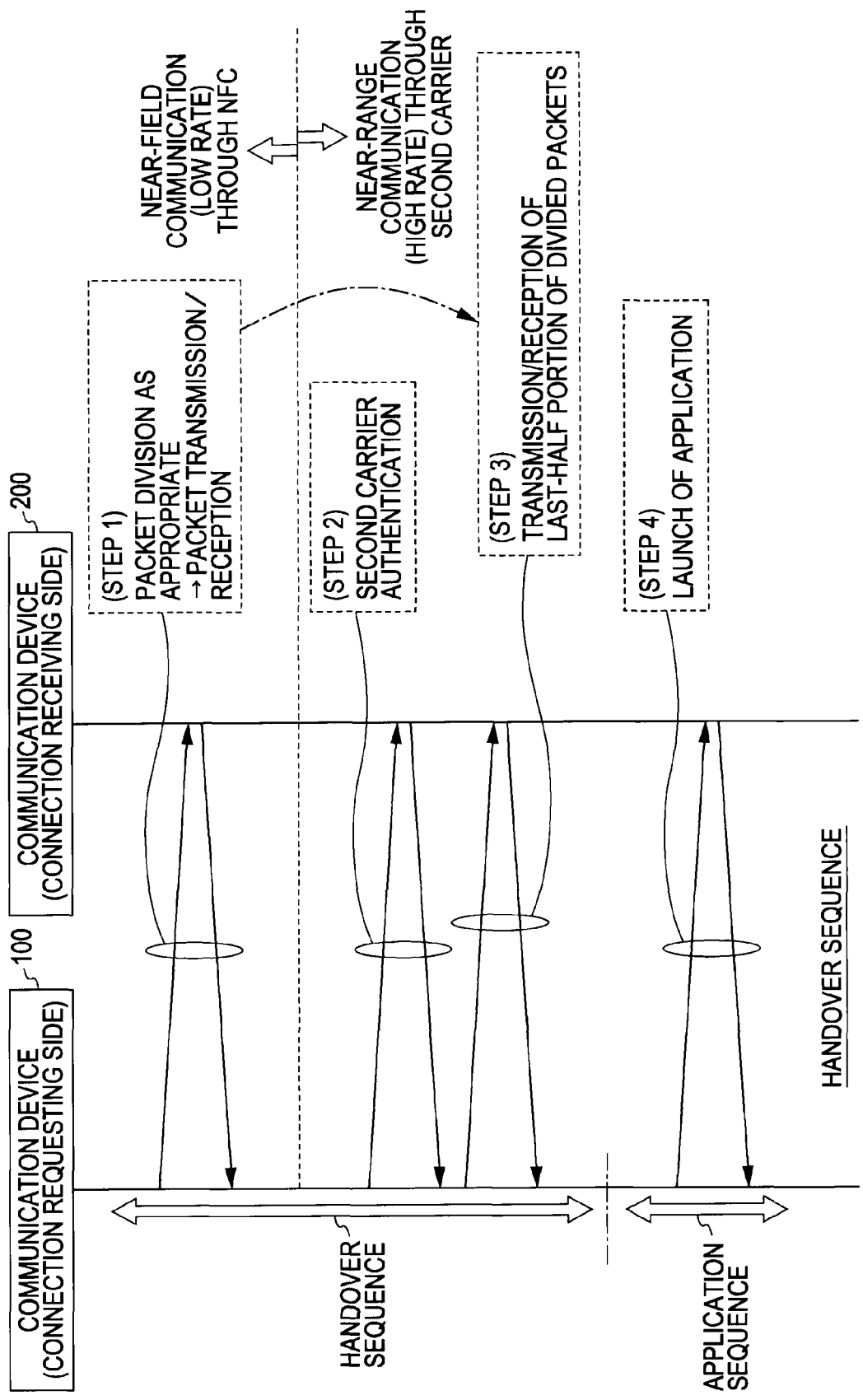
FIG. 9 is a diagram illustrating a handover sequence according to the embodiment.

A flow of the above-described transmission method will now be described in more detail with reference to FIG. 9. FIG. 9 is a diagram illustrating a procedure for transmitting divided packets according to the present embodiment. It is assumed in the following description that the communication device 100 is a connection requesting side and the communication device 200 is a connection receiving side.

In step 1, a handover message is divided to generate a first-half portion and a last-half portion and an NFC communication packet corresponding to the first-half portion is transmitted and received. In this case, the user places the communication devices 100 and 200 close to each other in a communication coverage range, such as in the range of about 10 cm, and maintains this state until NFC communication is completed.

In this case, since the reconfigured NFC communication packet in the present embodiment mainly contains only identification information for the second communication mode and so on, the NFC communication is completed in a very short period of time. This arrangement, therefore, reduces the period of time in which the user should maintain the communication devices 100 and 200 close to each other and thus reduces the user's load. After the completion of the NFC communication, the user may leave the communication devices 100 and 200 out of the NFC communication coverage range.

Next, in step 2, the communication devices 100 and 200 use the authentication information contained in the NFC communication packet to execute authentication processing for establishing a communication channel in the second communication mode. Since this authentication processing is executed through packet communication using the second communication mode that has a wider communication coverage range, the communication devices 100 and 200 may be left distant from each other. In step 3, when the authentication processing is successfully completed, the second-communication-mode communication packet corresponding to the last-half portion of the divided packets is transmitted and received.

In this case, the communication is started based on the information regarding the second communication mode, the information being added to the end of the NFC communication packet transmitted in step 1. For example, the protocols for the second communication mode and parameters are referred to. In step 4, each of the communication devices 100 and 200 extracts, from the received last-half portion of the communication packets, parameter information and so on used for launching an application, and then launches the application by using the parameter information.

The method for dividing the handover message and the method for transmitting the divided packets have been described above. As described above, transmitting the divided handover messages so as to reduce the size of data transmitted in the NFC communication makes it possible to reduce the time for the NFC communication and makes it possible to reduce the time during which the user maintains the communication devices 100 and 200 close to each other.

In addition, during transmission of data, increasing the ratio of use of the second communication mode, which enables more high-rate transmission than the second communication mode, makes it possible to reduce the time for communication processing. Such an arrangement can reduce the overall time taken before the launch of the application.

(Detailed Flows of Handover Processing)

Detailed flows of handover processing according to the present embodiment of the present invention will now be described with reference to FIGS. 10 to 13. FIGS. 10 to 13 are flowcharts showing detailed flows of handover processing according to the present embodiment. The flowcharts show details of the flows of the process of the above-described handover processing and particularly include a processing process for communication-process intermediation and a processing process for determining whether or not a packet is to be divided in accordance with a communication protocol supported by the target communication device.

(Processing Performed by Handover Requesting Side)

Figure 10:
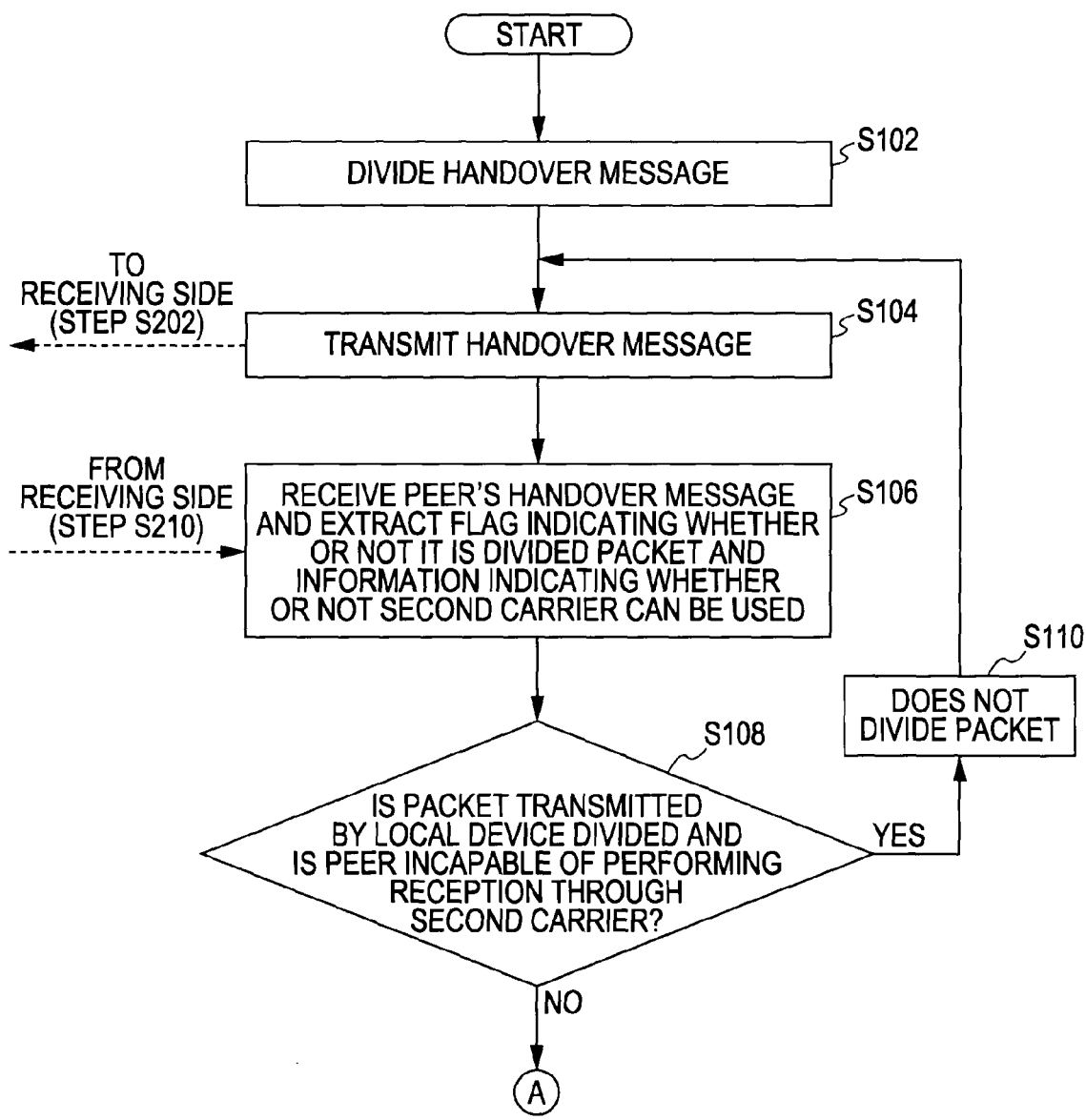
FIG. 10 is a flowchart illustrating the flow of a communication method according to the embodiment.
Figure 11:
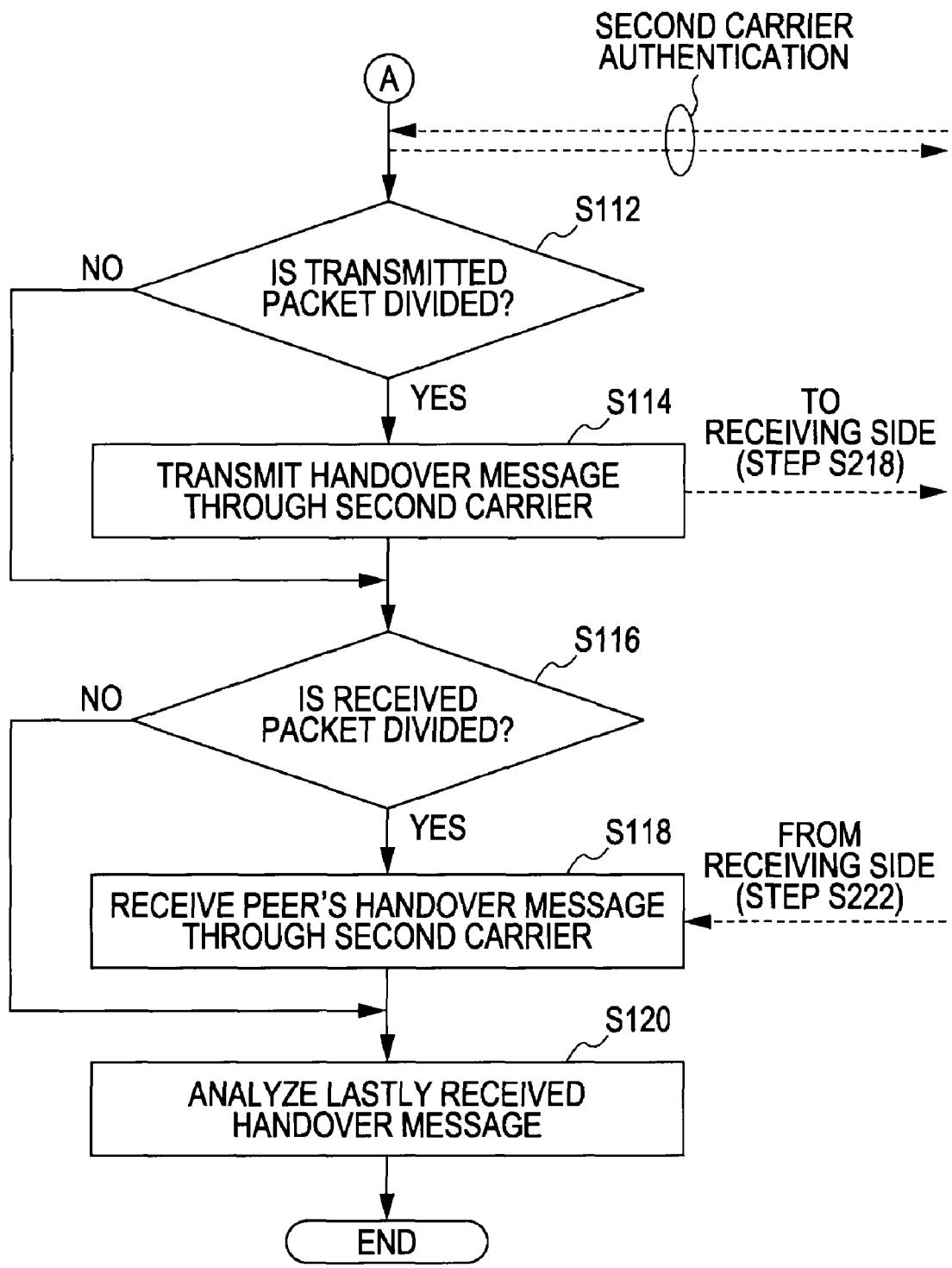
FIG. 11 is a flowchart illustrating the flow of the communication method according to the embodiment.

First, a description will be given with reference to FIGS. 10 and 11. FIGS. 10 to 11 are flowcharts showing the flow of processing for the handover-requesting side (the communication device 100). In particular, FIG. 10 shows the flow of processing for the NFC communication. FIG. 11 shows the flow of processing for the second communication mode (the second carrier communication).

When the handover processing is started, the communication device 100 divides the handover message in step S102. In this case, on the basis of the above-described dividing method, the communication device 100 divides the handover message into a first-half portion to be transmitted in the NFC communication and a second-half portion. Next, in step S104, the communication device 100 transmits the handover message to the connection receiving side (the "peer" communication device 200). In this case, the communication device 100 uses the near-field communication section 104 to transmit, to the communication device 200, an NFC communication packet corresponding to the first-half portion of the divided handover messages. The NFC communication packet transmitted at this point is processed in step S202 described below and shown in FIG. 12.

In step S106, the communication device 100 then receives a handover message (an NFC communication packet) from the peer communication device 200. The communication device 100 then extracts a flag indicating whether or not the received handover message is a divided packet (the flag is hereinafter referred to as a "division flag") and information indicating whether or not the second communication mode can be used (the information is hereinafter be referred to as "mode support information"). The NFC communication packet received at this point corresponds to a packet transmitted from the communication device 200 in step S210 described below and shown in FIG. 12.

Next, in step S108, the communication device 100 determines whether or not the NFC packet transmitted by the local device 100 in step S104 is a divided one of the original handover message and also determines whether or not the communication protocols (e.g., an OPP or SPP in the case of BT; and an IP socket, FTP, and so on in the case of WLAN) of the second communication mode of the communication device 100 are unsupported by the communication device 200. In this case, on the basis of the mode support information extracted from the received NFC communication packet, the communication device 100 can recognize the second-communication-mode protocols supported by the communication device 200.

When the communication device 200 does not support the communication protocols for the second communication mode for transmitting a communication packet corresponding to the last-half portion of the handover message, the communication device 200 cannot receive the communication packet. Thus, a determination is made as to whether or not the NFC communication packet transmitted by the communication device 100 is a divided one and whether or not the communication device 200 supports the communication protocols for transmitting a communication packet corresponding to the last-half portion.

When it is determined in step S108 the NFC communication packet transmitted by the communication device 100 is a divided one and the communication device 200 is incapable of receiving a communication packet corresponding to the last-half portion, the process proceeds to step S110. On the other hand, when it is determined in step S108 that the communication device 100 has not transmitted a divided NFC communication packet or the communication device 200 is capable of receiving a communication packet corresponding to the last-half portion, the process proceeds to authentication processing (FIG. 11) in the second communication mode.

When the process proceeds to processing in step S110, the communication device 100 does not divide the handover message. Then, in step S104, through NFC communication, the communication device 100 uses the NFC communication to transmit all setting information contained in the handover message. In this case, the communication time of the NFC communication is not reduced.

A description will be given next with reference to FIG. 11. When the process proceeds to authentication processing using the second communication mode, the communication device 100 exchanges information to be used for the authentication processing and then executes the authentication processing with the communication device 200 by using the second communication mode. When the authentication processing is successfully completed, the process of the communication device 100 proceeds to processing in step S112.

In step S112, the communication device 100 determines whether or not the NFC communication packet transmitted in step S104 (FIG. 10) is a divided one. When it is determined that the NFC communication packet is a divided one, the process of the communication device 100 proceeds to processing in step S114. On the other hand, when the transmitted NFC communication packet is an undivided one, the process of the communication device 100 proceeds to processing in step S116.

In step S114, the communication device 100 transmits the remaining handover message through the second-communication-mode communication channel already established via the authentication processing. The remaining handover message transmitted at this point is processed in step S218 described below and shown in FIG. 13.

Subsequently, in step S116, the communication device 100 determines whether or not the NFC communication packet received in step S106 (FIG. 10) is a divided one. When the received NFC communication packet is a divided one, the process of the communication device 100 proceeds to processing in step S118. On the other hand, when the received communication packet is an undivided one, the process of the communication device 100 proceeds to processing in step S120.

In step S118, in the second communication mode, the communication device 100 receives the remaining handover message from the peer communication device 200. This handover message is one transmitted in step S222 described below and shown in FIG. 13. In step S120, the communication device 100 analyzes a lastly received handover message and launches an appropriate application.

(Processing Performed by Handover Receiving Side)

Figure 12:
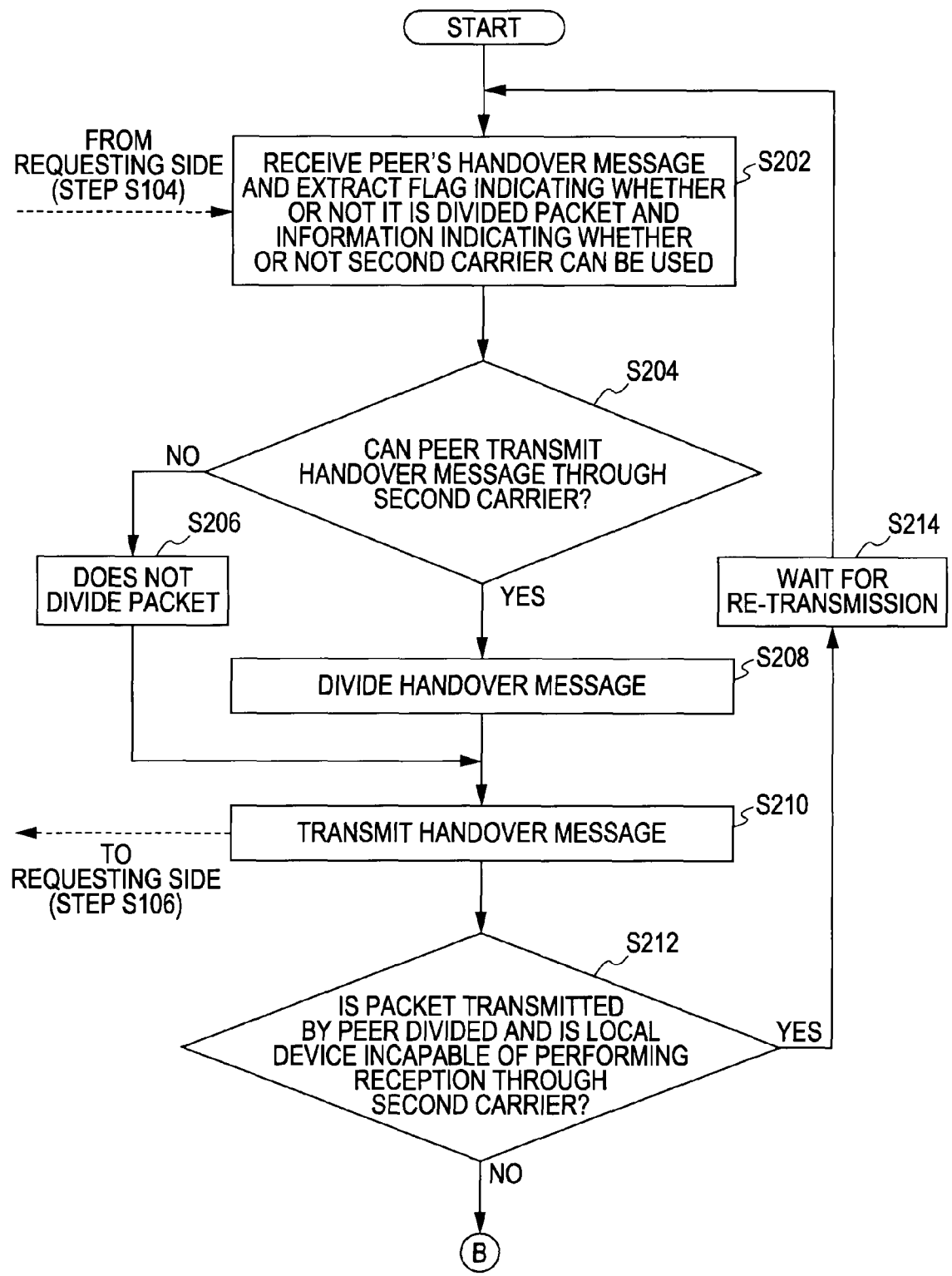
FIG. 12 is a flowchart illustrating the flow of the communication method according to the embodiment.
Figure 13:
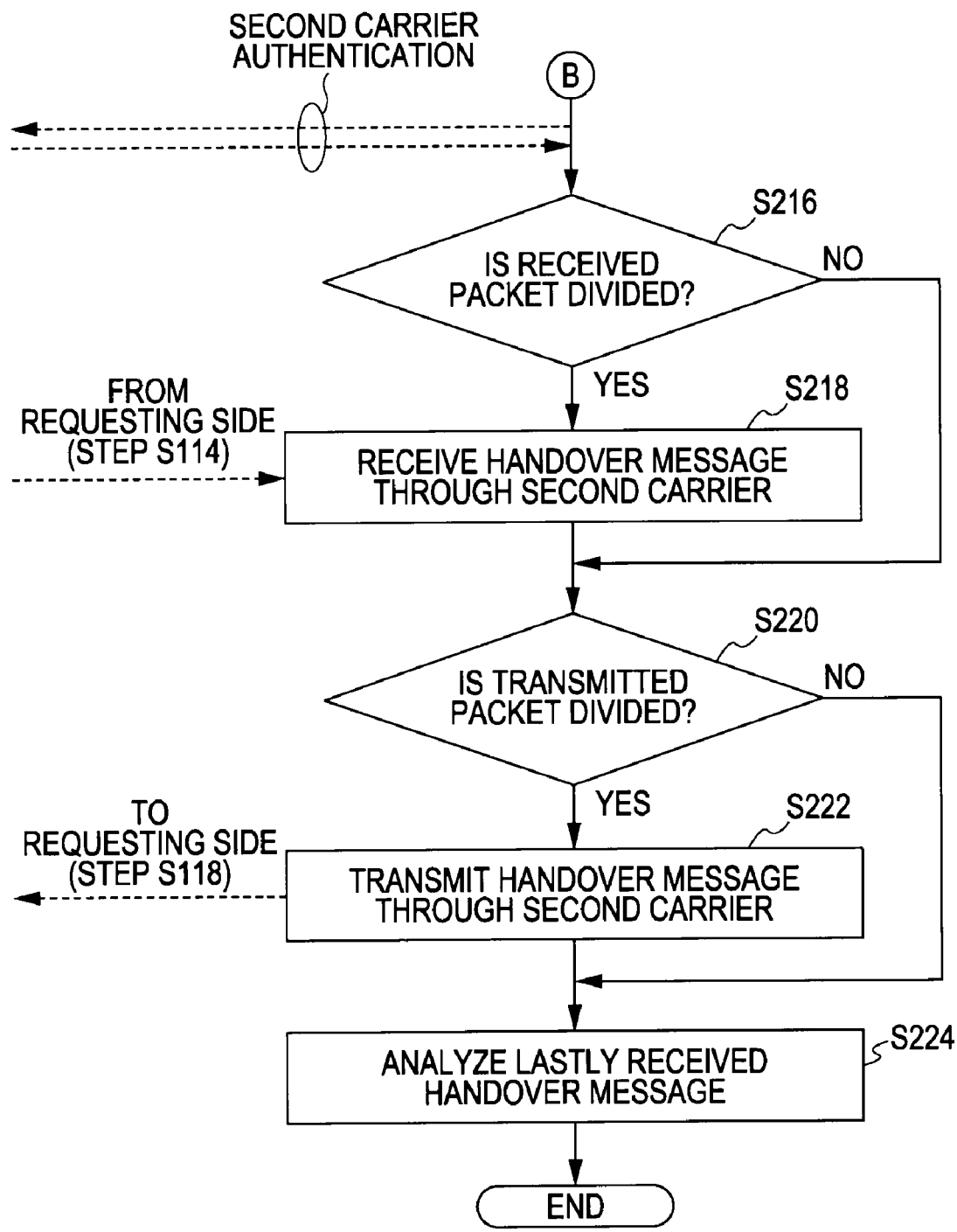
FIG. 13 is a flowchart illustrating the flow of the communication method according to the embodiment.

A description will now be given with reference to FIGS. 12 and 13. FIGS. 12 to 13 are flowcharts showing a flow of processing performed by the handover receiving side (the communication device 200). In particular, FIG. 12 shows the flow of processing for the NFC communication. FIG. 13 shows the flow of processing for the second communication mode (the second carrier communication).

First, in step S202, the communication device 200 receives the handover message (the NFC communication packet) from the "peer" communication device 100. In this case, the communication device 200 receives the NFC communication packet transmitted by the communication device 100 in step S104 shown in FIG. 10.

The communication device 200 then extracts, from the received NFC communication packet, the division flag indicating whether or not the NFC communication packet is a divided one and the mode support information indicating whether or not the communication device 100 supports communication protocols of the second communication mode of the communication device 200. Examples of the communication protocols include an OPP or SPP in the case of BT and an IP socket, FTP, and so on in the case of WLAN.

In step S204, on the basis of the extracted mode support information, the communication device 200 determines whether or not the handover message can be transmitted using the second communication mode. When it is determined that the transmission can be performed using the second communication mode, the process of the communication device 200 proceeds to processing in step S208. On the other hand, when it is determined in step S204 that the transmission cannot be performed using the second communication mode, the process of the communication device 200 proceeds to processing in step S206.

When the process proceeds to the processing in step S206, this means that the communication device 100 does not support the second-communication-mode communication protocols supported by the communication device 200. Thus, in step S206, the communication device 200 does not divide the handover message. In step S210, the communication device 200 transmits all messages in the NFC communication.

On the other hand, when the process proceeds to processing in step S208, the communication device 200 divides the handover message. In step S210, the communication device 200 transmits only an NFC communication packet corresponding to the first-half portion by using the NFC communication. The handover message transmitted in step S210 is processed in step S106 shown in FIG. 10.

In step S212, the communication device 200 determines whether or not the NFC communication packet transmitted by the peer communication device 100 is a divided one and whether or not the local device 200 can receive the NFC communication packet through the second communication mode.

When a divided NFC communication packet (the first-half portion) is transmitted from the communication device 100 and the second-communication-mode communication protocols for receiving the last-half portion are unsupported by the communication device 200, the communication device 100 re-transmits an NFC communication packet. That is, when the received NFC communication packet is a divided one and the protocols for receiving the last-half portion of the NFC communication packet are unsupported by the local device 200, the process proceeds to processing in step S214.

In step S214, the communication device 200 waits for an NFC communication packet re-transmitted from the communication device 100. The process then returns to processing in step S202. On the other hand, when the received NFC communication packet is an undivided one or the communication device 200 supports the protocols for receiving the last-half portion, the process of the communication device 200 proceeds to authentication processing (FIG. 13) using the second communication mode.

A description will be given next with reference to FIG. 13. When the process proceeds to the authentication processing using the second communication mode, the communication device 200 exchanges information used for the authentication processing and then executes the authentication processing with the communication device 100 by using the second communication mode. When the authentication processing is successfully completed, the process of the communication device 200 proceeds to processing in step S216.

In step S216, the communication device 200 determines whether or not the NFC communication packet received in step S202 (FIG. 12) is a divided one. When the received NFC communication packet is a divided one, the process of the communication device 200 proceeds to processing in step S218. On the other hand, when the received NFC communication packet is an undivided one, the process of the communication device 200 proceeds to processing in step S220.

In step S218, the communication device 200 receives the remaining handover message through the second-communication-mode communication channel already established via the authentication processing. The remaining handover message received at this point is the one transmitted in step S114 shown in FIG. 11.

In step S220, the communication device 200 determines whether or not the NFC communication packet transmitted in step S210 (FIG. 12) is a divided one. When the transmitted communication packet is a divided one, the process of the communication device 200 proceeds to processing in step S222. On the other hand, when the transmitted NFC communication packet is an undivided one, the process of the communication device 200 proceeds to processing in step S224.

In step S222, the communication device 200 transmits the remaining handover message to the communication device 100 through the second communication mode. This handover message is processed in step S118 shown in FIG. 11. In step S224, the communication device 200 analyzes a lastly received handover message and launches an appropriate application.

The above description has been given of the functional configuration of the communication devices 100 and 200 according to the embodiment of the present invention, the layout of the handover message, the method for dividing the handover message, and the procedure for exchanging the divided handover messages.

As described above, in the present embodiment, a packet to be transmitted in the first communication mode is divided into two portions, the first-half portion thereof is transmitted in the first communication mode, and authentication using the second communication mode is performed based on authentication information contained in the first-half portion. Additionally, after the authentication processing is successfully completed, packet information in the last-half portion is transmitted.

This arrangement reduces the amount of communication data in the first communication mode and reduces the communication time in the first communication mode. As a result, the user does not have to maintain, for a long period of time, the predetermined communication state resulting from limitations (such as a distance and an angle at which communication can be performed) of the second communication range. Thus, the user's load is reduced during communication using the first communication mode and the user convenience improves.

Adding information regarding the transmission protocols for transmitting the last-half portion of the divided communication packets to the first-half portion of the communication packet allows the packet of the last-half portion to be transmitted using optimum transmission protocols that are supported by both devices. In the absence of protocols that can be used by both devices, all information contained in the communication packet can be transmitted using the first communication mode. As described above, the states of the protocols supported by the peer communication device and the local device are compared with each other to allow a more appropriate mode to be selected. As a result, versatility increases.

[Example of Configuration of Contactless Communication Device]

Now, an example of the configuration of a contactless communication device that is capable of realizing some or all functions of the above-described devices will be briefly described with reference to FIG. 14. FIG. 14 is a diagram illustrating an example of the configuration of a contactless communication device. The functions of the above-described devices may be realized using some or all of elements included in the contactless communication device.

As shown in FIG. 14, this contactless communication device generally includes an IC card section, a reader/writer section, and a controller 722.

(IC Card Section)

The IC card section includes, for example, an antenna 702, a front-end circuit 704, a modulator 706, a command regenerator 708, a clock regenerator 710, a control circuit 712 (which may be a CPU), an encryption circuit 714, a memory 716, and a wired interface circuit 718.

The antenna 702 has a loop antenna, which magnetically couples with a loop antenna of the reader/writer section to receive commands and power. The front-end circuit 704 rectifies carrier waves, transmitted from the reader/writer section, to regenerate direct-current power.

The front-end circuit 704 divides the frequency of obtained 13.56 MHz carrier waves and inputs the divided frequencies to the command regenerator 708 and the clock regenerator 710. The command regenerator 708 regenerates a command from the input carrier waves and inputs the command to the control circuit 712. The clock regenerator 710 regenerates a clock for driving a logic circuit from the input carrier waves and inputs the clock to the control circuit 712. The front-end circuit 704 supplies the regenerated power to the control circuit 712.

When power is supplied to all circuits, the control circuit 712 drives the circuits in accordance with a regenerated command. Data is output from the control circuit 712, is encrypted by the encryption circuit 714, and is stored in the memory 716. The memory 716 may be, for example, a storage device for magnetically, optically, or magneto-optically storing information or may be a semiconductor storage device used for a ROM, RAM, or the like.

On the other hand, for transmission of encrypted data stored in the memory 716, the front-end circuit 704 changes the load impedance at a power-supply point for the antenna 702, on the basis of the encrypted data modulated by the modulator 706, to change a magnetic field induced by the antenna 702. The change in the magnetic field induces a change in current flowing through the electromagnetically coupled antenna of the reader/writer section, and encrypted data is transmitted.

The control circuit 712 may be controlled by the controller 722 via the wired interface circuit 718. The IC card section may have the capability of transmitting/receiving information to/from the reader/writer section via an interface (not shown) to allow the both to control each other or to allow one to control the other.

(Reader/Writer Section)

The reader/writer section includes, for example, an antenna 702, a filter 732, a reception amplifier 734, a frequency converter 736, a discriminator 738, a logic circuit 740, a control circuit 712 (CPU), a memory 716, a wired interface circuit 742, a modulator 746, a transmission amplifier 748, and a local oscillator 750.

The reader/writer section supplies commands and power by utilizing magnetic coupling with the contactless IC card or the like. Under the control of the control circuit 712, the reader/writer section activates the contactless card or the like by supplying power thereto and then starts communication in accordance with a predetermined transmission protocol. At this point, the reader/writer section performs establishment of a communication link, anti-collision processing, authentication processing, and so on.

The reader/write section uses the local oscillator 750 to generate carrier waves. For transmission of information, first, the control circuit 712 reads data from the memory 716 and sends the read data to the logic circuit 740. The modulator 746 then modulates the carrier waves, generated by the local oscillator 750, on the basis of a signal output from the logic circuit 740. The transmission amplifier 748 amplifies the carrier waves output from the modulator 746 and transmits the amplified carrier waves via the antenna 702.

On the other hand, for reception of information, carrier waves received via the antenna 702 are input to the reception amplifier 734 via the filter 732. The reception amplifier 734 then amplifies the carrier waves to provide an amplified signal, which is then frequency-converted by the frequency converter 736, and the resulting signal is input to the logic circuit 740. A signal output from the logic circuit 740 is recorded in the memory 716 by the control circuit 712. Alternatively, the signal output from the logic circuit 740 is sent to the external controller 722 via the wired interface circuit 742.

The above-description has been given of an example of the configuration of the contactless communication device. Examples of the contactless communication device include a mobile phone, a mobile information terminal, a communication device, an information processing apparatus (such as a personal computer), a game machine, and a home information appliance. Any equipment that incorporates some or all of the functions or the elements of the above-described contactless communication device is also encompassed by the technical scope of the embodiment of the present invention.

[Hardware Configuration (Information Processing Device)]

Figure 15:
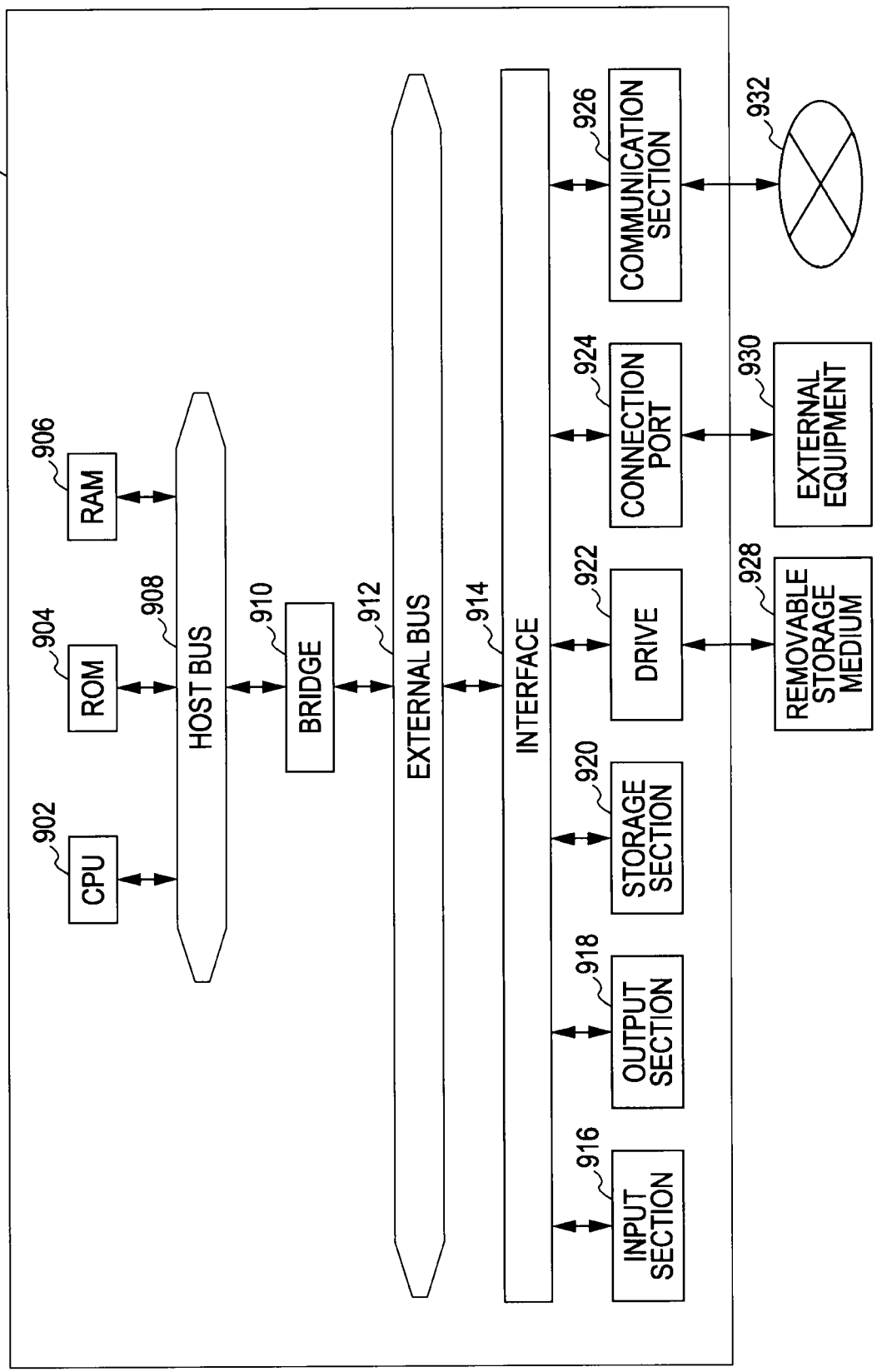
FIG. 15 is a diagram illustrating another example of the hardware configuration of the communication device according to the embodiment.

The functions of the elements of any of the above-described devices can be realized with an information processing apparatus with a hardware configuration shown in FIG. 15 by using a computer program for realizing the above-described functions. FIG. 15 is a diagram illustrating the hardware configuration of an information processing apparatus that is capable of realizing the functions of the elements of the above-described device.

As shown in FIG. 15, the information processing apparatus generally includes a CPU 902, a ROM 904, a RAM 906, a host bus 908, a bridge 910, an external bus 912, an interface 914, an input section 916, an output section 918, a storage section 920, a drive 922, a connection port 924, and a communication section 926.

The CPU 902 serves as, for example, a computation processing device or a control device, and controls overall or partial operation of the elements, on the basis of various programs recorded in the ROM 904, the RAM 906, the storage section 920, or a removable storage medium 928.

The ROM 904 stores, for example, programs read by the CPU 902, data used for computation, and so on. The RAM 906 temporarily or permanently stores, for example, programs read by the CPU 902 and various parameters that vary as appropriate during execution of the programs. The elements of the information processing apparatus are interconnected through the host bus 908 that can perform high-rate data transmission. The host bus 908 is also connected to, for example, the external bus 912, which has a relatively low data transmission rate, via the bridge 910.

The input section 916 serves as operating means including, for example, a mouse, a keyboard, a touch panel, a button, a switch, and a lever. The input section 916 may be remote controlling means (the so-called "remote controller") that can transmit a control signal by using infrared rays or other radio waves. The input section 916 includes, for example, an input control circuit for sending information, input through the use of the above-described operating means, to the CPU 902 as an input signal.

The output section 918 may be, for example, a device that is capable of visually or acoustically notifying the user of obtained information. Examples of the output section 918 include a display device (such as a CRT [cathode ray tube] display, an LCD [liquid crystal display], a PDP [plasma display panel] display, or an ELD [electro-luminescent display]), an audio output device (such as a speaker or a headphone), a printer, a mobile phone, and a facsimile machine.

The storage section 920 is a device for storing various types of data. Examples of the storage section 920 include a magnetic storage device (such as a hard disk drive [HDD]), a semiconductor storage device, an optical storage device, and a magneto-optical storage device.

The drive 922 is a device for reading information recorded on/in the removable storage medium 928, such as a magnetic disk, an optical disk, a magneto-optical disk, or a semiconductor memory, and for writing information to the removable storage medium 928. Examples of the removable storage medium 928 include a DVD (digital versatile disc) medium, a Blu-ray medium, an HD-DVD, a CompactFlash® (CF) medium, a memory stick, and a secured digital (SD) memory card. Naturally, the removable storage medium 928 may be, for example, an IC card having a contactless IC chip, an electronic device, or the like.

The connection port 924 is a port to which external equipment 930 is connected. Examples of the connection port 924 include a USB (universal serial bus) port, an IEEE 1394 port, a SCSI (small computer system interface), an RS-232C port, and an optical audio terminal. Examples of the external equipment 930 include a printer, a portable music player, a digital camera, a digital video camera, and an IC recorder.

The communication section 926 is a communication device for connection to a network 932. Examples of the communication section 926 include a wired or wireless LAN (local area network), a Bluetooth® device, a communication card for a WUSB (wireless USB), a router for optical communication, a router for an ADSL (asymmetric digital subscriber line), and a modem for various types of communication.

The network 932 to which the communication section 926 is connected may be realized by a network connected in a wired or wireless manner. Examples include the Internet, a home LAN, infrared communication, visible-light communication, broadcast, human-body communication, and satellite communication. The function of the communication section 926 may include the contactless communication function of the above-described contactless communication device.

[Supplement 1: <SSP>]

The technology according to the above-described embodiment is preferably applicable to SSP (secure simple pairing) described below.

[1: Proposed Model for SSP]

Four models are proposed for SSP. These four models are referred to as a "numeric comparison model", a "JW (just works) model", an "OOB (out of band) model", and a "passkey entry model". The proposed models are briefly described below.

(1-1: Numeric Comparison Model)

The numeric comparison model is designed for scenarios as follows:

(1) both devices that are to communicate to each other are capable of displaying 6-digit numbers; and (2) both devices are capable of having the user to enter "Yes" or "No". For example, a cellular phone or a personal computer is used for this scenario.

(Procedure of Establishing Pairing)

First, the user sees 6-digit numbers (from "000000" to "999999") displayed on displays of both devices. The user is then asked whether or not the numbers displayed on both devices are the same. The user then enters "Yes" or "No" on both devices. If "Yes" is entered on both devices, the pairing is successful.

(Purposes of Numeric Comparison Model)

This numeric comparison model has two purposes. First one is to provide, when individual devices do not have unique names, confirmation to the user that the correct devices are connected with each other. The second purpose is to provide protecting means against man-in-the-middle attacks.

It is also to be noted that, from a cryptographic point of view, there is a significant difference between this numeric comparison model and a PIN input model used by BT Core Specification version 2.0+ EDR and earlier. The 6-digit number used in this numeric comparison model results from an artifact of the security algorithm and is not a number manually input by a user, as in the current security model. Knowing the displayed number is of no benefit in decrypting the encoded data exchanged between the two devices.

(1-2: Just Works Model)

The JW model is designed for the following scenario. In this scenario, it is assumed that at least one of the devices do not have a display that is capable of displaying a 6-digit number nor does it have a keyboard for entering a 6 decimal digit. For example, a mobile phone or a mono handset is used for the scenario. This is because most handsets do not have a display.

The JW model uses a numeric comparison protocol. The user, however, is not shown a number. The application in the JW model may simply ask the user to accept the connection. The JW model provides protecting means having the same resistance as the above-described numeric comparison model against passive eavesdropping. The JW model, however, does not provide protecting means against man-in-the-middle attacks.

When compared with a security model of a typical handset with a 4-digit number (a fixed PIN) or the like, the security level of the JW model is considered relatively high. The reason is that a high degree of resistance against passive eavesdropping is realized.

(1-3: OOB Model)

The OOB (out of band) model is designed for scenarios as follows. An OOB technology is used to both the devices as well as to exchange or transfer cryptographic numbers in the pairing process. In order to be effective from a security point of view, the OOB channel should provide different properties in terms of security compared to the Bluetooth radio channel. The OOB channel provides protecting means against man-in-the-middle attacks and privacy violation.

The user's operation may differ depending on the OOB mechanism. For example, when near field communication (NFC) is used as OOB communication, the user(s) initially touches the two devices together. The user is then asked whether he or she wishes to pair with the other device. In response, the user enters "Yes" or "No". If "Yes" is entered, the pairing is successful.

The above-described operation is a single-touch operation for exchanging information between the devices. The information exchanged includes device information, such as BD addresses used for discovering BDs, and security information used for encryption. One of the devices can use the received BD address to establish a connection with the other device. The exchanged security information is used for authentication processing. One-way or two-way authentication processing is accomplished depending on characteristics of the OOB mechanism.

The OOB is selected only in the following cases. Examples of the cases include a case in which the pairing has already been activated by OOB information exchange and a case in which one or both of the devices issue a notification indicating that the capability of supporting the OBB during response of the presence/absence of the input/output (IO) capability.

The OOB uses information for simply asking the user to confirm connection. Any OOB mechanism that can exchange cryptographic information and BD addresses is applicable to the OOB model. The OOB model does not support means with which the user has activated a connection using BT communication and would like to use the OOB channel for authentication processing during a connection.

(1-4: Passkey Entry Model)

The passkey entry model is designed for scenarios as follows:

(1) one device has an input capability but does not have the capability to display a 6-digit number; and (2) the other device has output capabilities. This model is applied to, for example, a combination of a personal computer and a keyboard.

First, the user is shown a 6-digit number (from "000000" to "999999") displayed on the display of one of the devices. The user is then asked to enter the displayed number on the other device. If the displayed number is properly entered on the other device, the pairing is successful.

[2: Security Establishing Means]

Security establishing means for the SSP includes five phases:

Phase 1: Public Key Exchange,
Phase 2: Authentication Stage 1,
Phase 3: Authentication Stage 2,
Phase 4: Link Key Calculation, and
Phase 5: LMP Authentication and Encryption Phases, 1, 3, 4, and 5 are the same for all the models described above. Phase 2 (authentication stage 1), however, differs slightly depending on the model used. In the following description, terminologies ([Term]) defined in Table 1 shown below are used.

(2-1: Phase 1 <Public Key Exchange> (See FIG. 16A)) Initially, each device generates its own ECDH (Elliptic Curve Diffie-Hellman) public-private key pair (PK, SK) (step 1).

This key pair is generated only once for each set of devices. This key pair may be computed before start of pairing processing. At any time, the device may discard the key pair and generate a new key pair.

Pairing is initiated by the initiating device A sending its public key to the receiving device (hereinafter, the non-initiating device B) (step 1*a*). The responding device replies to the public key transmitted from the initializing device, by transmitting its own public key to the initializing device (step 1*b*). The public keys (PKa, PKb) are not regarded as secret although they may identify the devices. Steps 1*a* and 1*b* are the same for all the models described above.

(2-2: Phase 2 <Authentication Stage 1> (See FIGS. 17 to 20))

The authentication stage 1 has different processing among the three models (the numeric comparison model, the OOB model, and the passkey entry model). Which model is to be chosen is determined based on the presence/absence of IO capabilities of both devices. Numerals put in front of phrases in FIGS. 17 to 20 represent steps.

(2-2-1: Authentication Stage 1 (Numeric Comparison Model/FIG. 17))

The numeric comparison model provides protecting means having certain resistance against active man-in-the-middle attacks. A single man-in-the-middle attack would succeed with a probability of only about 0.000001. If there is no man-in-the-middle attack at the time the pairing is performed, the shared link key is computationally secure against passive eavesdropping that has been present during the pairing.

A description will now be given of a sequence diagram of authentication stage 1 in the numeric comparison model from the cryptographic point of view.

After the public keys have been exchanged, the devices select pseudo-random 128-bit nonces (Na, Nb) (steps 2*a* and 2*b*). The nonce values are used to prevent replay attacks. The nonce values are freshly generated with each instantiation of the paring protocol. The values should be generated directly from a physical randomness source or a good pseudo-random generator seeded with a random value from a physical source.

Subsequently, the responding device computes a commitment (Ca, Cb) to the two pubic keys that have been exchanged and its own nonce value (step 3*c*). This commitment is computed according to a function (f1) having a one directionality relative to input parameters used for computing the commitment. The commitment is transmitted to the initiating device A (step 4). This commitment is used to prevent an attacker from changing parameters at a later time.

The initiating device and the responding device then exchange the above-described nonce values (the pseudo random values (Na, Nb) (steps 5 and 6). Subsequently, the initiating device checks whether or not the commitment is correct (step 6*a*). A failure in the checking in step 6*a* indicates the presence of an attacker or the presence of other transmission error. If the check fails, the pairing establishment processing in this model is aborted. The above-described steps may be repeatedly executed with or without the generation of new key pairs. If, however, such steps are repeated, new nonces are generated.

When the commitment check succeeds, the two devices compute 6-digit numbers (confirmation values (Va, Vb)). The confirmation values are displayed to the user on the respective displays of the devices (steps 7*a*, 7*b*, and 8). The user is expected to check whether or not the 6-digit confirmation values match each other and to confirm whether there is a match. If there is no match, the authentication step is aborted. If, however, such steps are to be repeated, new nonces are generated.

An active man-in-the-middle must inject its own key material into this process to have any effect other than denial-of-service. A simple man-in-the-middle attack would result in two 6-digit display values being different with a probability of 0.999999. A more sophisticated attacker may attempt to engineer the display values to match, but this can be protected by the above-described authentication processing sequence.

(2-2-2: Authentication Stage 1 (OOB Model (FIG. 18))

The OOB model is selected when security information used for authentication has been received by at least one of the devices and indicated in the OOB Authentication Data Present parameter in the sequence of exchanging information for checking the presence/absence of the LMP IO capabilities.

If both devices can transmit and/or receive data over an OOB channel, then mutual authentication is accomplished through exchange of commitments (Ca, Cb) based on the OOB public keys (PKa, PKb).

First, if OOB communication is possible only in one direction (e.g., if a device equipped with a passive NFC tag or the like or if one device is a read only device), then authentication of the receiving device in the OOB communication is accomplished by that device knowing a random number r transmitted via the OOB communication. In such a case, the random number r must be secret. That is, the random number is generated afresh every time or access to the device sending the random number r is restricted. If the random number r is not transmitted by a device, the device receiving the OOB information (A, B, ra, rb, Ca, Cb) assumes that r is 0 in steps 4*a* and 4*b*.

If the OOB communication is sufficiently robust (e.g., is capable of providing protection against a man-in-the-middle attack), the OOB model is also not susceptible to man-in-the-middle attack. Also, in the OOB model, the size of the parameters (Ca, Cb, ra, rb) used for authentication does not need to be restricted by what the user can easily read or type. For such a reason, the OOB model can be more secure than the numeric comparison model or the passkey entry model. However, both devices need to have matching OOB interfaces.

[Rolls of Devices A and B]

The OOB model is symmetric with respect to the roles of the devices A and B. It does not require the device A to always initiate pairing. Asymmetry in the OOB communication is automatically resolved, for example, when one of the devices has an NFC tag and is capable of only transmitting OOB information.

However, when the link key (LK) is computed in step 12 (FIG. 16B), both devices input parameters in the same order. Otherwise, each device will compute a different key. That order is that, for example, the device A's parameters are those of the piconet master and the device B's parameters are those of the piconet slave.

[Order of Steps]

The public key exchange must be executed before the authentication-processing step (step 5). In the diagram, the public key exchange in the BT band between the devices (step 1) is executed before the OOB communication (step 4). However, when an OOB interface attempts to initiate the pairing, public key exchange will occur after the OOB communication (step 1 will be between step 4 and step 5).

[Values of Ra and Rb]

Since the direction of the OOB interface of the peer device cannot be verified before the OOB communication is executed, the device will always generate the values of ra and rb. If possible, the device will transmit through its OOB interface the random value r to the peer. Each device applies the following rules locally to set the values of its own r and the value of the peer's r.

1. Initially, r of the device is set to a random number and r of the peer is set to 0 (step 2);
2. If a device has received information in OOB, it sets the peer's value to what was sent by the peer (step 5); and
3. If the remote device does not indicate that it has received OOB authentication data, it sets its own value r to 0 (step 5).

These rules ensure that, if OOB communication is performed in authentication stage 2, both devices A and B have the same values for the input ra and rb.

(2-2-2-1: NFC as Example of OOB Mechanism)

NFC (near field communication) devices may support various modes for different data rates (106 kbps, 212 kbps, and 424 kbps) and different modes of operation (active and passive).

In addition, some NFC devices may have capabilities to initiate (initiator/reader mode) and accept connections (tag/target mode), whereas other devices may only have the capability to accept connections. For example, an OOB-IO NFC device has the capabilities to perform BT communication as well as transmit and receive data to and from another NFC device.

For application to the OOB mechanism, three scenarios are conceived so that the devices A and B are combined as follows:

(1) the device A is an OOB-IO NFC device and the device B is an OOB-O NFC device,
(2) the device A is an OOB-O NFC device and the device B is an OOB-IO NFC device, and
(3) the device A is an OOB-IO NFC device and the device B is an OOB-IO NFC device (where OOB-O indicates an output-only capability and OOB-IO indicates an input/output capability. That is, the OOB-O/OOB-O (tag/tag) case does not exist and one of the devices must be able to be a reader.

(2-2-3: Authentication Stage 1 <Passkey Entry Model> (See FIG. 19))

A sequence diagram for authentication stage 1 for the passkey entry model will now be described.

The user inputs an identical passkey into both devices. Alternatively, a passkey (ra, rb) may be generated and displayed on one of the devices. The user then inputs the displayed passkey to the other device (step 2). This short shared value (ra, rb) achieves the mutual authentication of the devices. Steps 3 to 8 are repeated k times for a k-bit passkey. For example, k=20 for 6-digit passkey (999999=0xF423F).

In steps 3 to 8, each device commits to each bit of the passkey, using a long nonce (128 bits), and transmitting the hash of the nonce, the bit of the passkey, and both public keys to the other device.

The devices then take turns revealing their commitments until the passkeys are mutually disclosed. The first device that is to reveal a commitment for a given bit of the passkey effectively reveals that bit of the passkey in the process. However, the other device has to reveal the corresponding commitment to show the same bit value for that bit of the passkey, or else the first device will then abort the authentication step, after which no more bits of the passkey are revealed.

This "gradual disclosure" is aimed to prevent leakage of more than 1 bit of un-guessed passkey information during a man-in-the-middle attack. Thus, a man-in-the middle attacker having only partial knowledge of the passkey can only guess an uncertain bit of the passkey before the authentication step fails. Hence, a man-in-the-middle attacker will only gain an advantage of at most two bits over a simple brute-force attacker which succeeds with a probability of 0.000001. The long nonce is included in the commitment hash to make a brute-force attack difficult even after the authentication step has failed.

The public Diffie-Hellman values are included to tie the Passkey entry model to the original ECDH key exchange, in order to prevent a man-in-the-middle attack from substituting the attacker's public key on both sides of the ECDH exchange in standard man-in-the-middle attach fashion. At the end of this stage, Na is set to Na20 and Nb is set to Nb20 for use in authentication stage 2.

(2-3: Phase 3 <Authentication Stage 2> (See FIG. 20))

Authentication stage 2 confirms that both devices have successfully completed the exchange of the authentication information. This stage is the same for the three models described above.

First, each device computes a confirmation value (Ea, Eb). The confirmation value is computed based on the previously exchanged parameters and the newly derived shared key (step 9). The initializing device then transmits its confirmation value to the responding device. Next, the responding device checks the transmitted confirmation value (step 10). A failure in this check indicates that the initializing device has not confirmed the pairing. In this case, this authentication step is aborted.

The responding device then transmits the confirmation value generated thereby to the initializing device. The initializing device checks the confirmation value (step 11). A failure in this check indicates that the responding device has not confirmed the pairing. In this case, this authentication step is aborted.

(2-4: Phase 4 <Link Key Computation> (See FIG. 16B))

When both devices have confirmed the pairing, a link key (LK) is computed from the shared key (DHKey) and the publicly exchanged data (step 12). The nonces used in this case ensure the freshness of the link key, even if long-term ECDH values are used by both sides. The link key is used to maintain the pairing.

During computation of the link key, both devices input parameters. These parameters are input in the same order to ensure that both devices compute the same link key. The parameters also include information indicating that the device A's parameters are those of the piconet master and the device B's parameters are those of the piconet slave.

(2-5: Phase 5, LMP Authentication and Encryption)

The final phase in the simple pairing is generating the encryption keys. This phase is executed in the same manner as the final step in legacy pairing.

[3: Functions for Cryptography]

(3-1: Elliptic Curve Definition)

The SSP uses an elliptic curve of an FIPS (Federal Information Processing Standards) publication P-192 curve for encryption. The values of elliptic curves E are determined by using parameters p, a, and b as arguments, as expressed by:

$$E: y^2 = x^3 + a \cdot x + b \pmod{p} \tag{1}$$

For each value of the parameter b, a unique curve can be determined. In NIST (National Institute of Standards and Technology) P-192, the parameter a is defined by:

$$a = \mathrm{mod}(-3, p) \tag{2}$$

On the other hand, the parameter b is defined and a method of generation thereof can be verified using SHA-1 (with a given seed s and using $b^2 s = -27 \pmod{p}$). The following parameters are also given.

Main parameters are prime modulus (absolute values) p, order r, base-point x coordinate Gx, and base-point y coordinate Gy. The integers p and r are given in decimal form. Bit strings and field elements are given in hex (hexadecimal form). These parameters are given by, for example, the following numeric values:

(#1): p=6277101735386680763835789423207666416083908 70039 0324961279

(#2): r=6277101735386680763835789423176059013767194773182842284081

(#3): b=64210519 e59c80e7 0fa7e9ab 72243049 feb8deec c146b9b1

(#4): Gx=188da80e b03090f6 7cbf20eb 43a18800 f4ff0afd 82ff1012

(#5): Gy=07192b95 ffc8da78 631011ed 6b24cdd5 73f977a1 1e794811

The function P192( ) is defined as follows. Given an integer u ($0<u<r$) and a point V on the curve E, the value P192(u, V) is computed as the x-coordinate of the u-th multiple mV of the point V. The private keys shall be between 1 and r/2, where r is the order of an abelian group on the elliptic curve (e.g., between 1 and $2^{192}/2$).

(3-2: Cryptographic Function Definition)

In addition to computing the elliptic curve Diffie-Hellman key, protocols of the numeric comparison model, the OOB model, and the passkey entry model use four cryptographic functions. These functions are functions f1, g, f2, and f3.

Function f1 is used to generate the 128-bit commitment values Ca and Cb. Function g is used to compute numeric check values. Function f2 is used to compute the link key and other keys deduced using DHKey and random nonces. Function f3 is used to compute check values Ea and Eb in authentication stage 2. A basic configuration for these functions is based on SHA-256.

(3-2-1: Commitment Generating Function f1 in SSP)

The commitments are computed with function f1. The definition of the SSP uses the MAC function (HMAC) based on SHA-256. The HMAC is denoted as HMAC-SHA-256$_X$ with a 128-bit key. Parameters (U, V, X, and Z) input to function f1 in the SSP are as follows.

U has a 192-bit value. V has a 192-bit value. X has a 128-bit value. Z has an 8-bit value.

Z is zero (i.e., 8 bits of zeros) for the protocols of the numeric comparison model and the OOB models. In the passkey entry model protocol, the most significant bit of Z is set to one and the least significant bit is generated from one bit of the passkey. For example, if the passkey is "1", then Z=0x81, and if the passkey is "0", then Z=0x80.

The output of function f1 in the SSP is given by:

$$f1(U, V, X, Z)=\text{HMAC-SHA-256}X(U||V||Z)/2^{128} \quad (3)$$

The inputs to function f1 are different depending on protocols, as shown in Table 2 below.

In this case, PKax denotes the x-coordinate value of the public key PKa of the device A. Similarly, PKbx denotes the x-coordinate value of the public key PKb of the device B. Nai is the nonce value of the i-th round of repeated processing. For each process of the repeated processing, the value of Nai becomes a new 128-bit number. Similarly, rai is one-bit value of the passkey expanded to 8 bits (e.g., 0x80 or 0x81).

(3-2-2: Numeric Verification Function g in SSP)

Function g in the SSP is defined as follows: The formats of the inputs (U, V, X, and Y) to function g in the SSP are as follows.

U has a 192-bit value. V has a 192-bit value. X has a 128-bit value. Y has a 128-bit value.

The output of function g in the SSP is given by:

$$g(U, V, X, Y)=\text{SHA-256}(U||V||X||Y) \bmod 2^{32} \quad (4)$$

The numeric verification value is taken as six least significant bits of the 32-bit integer g (PKax, PKbx, Na, Nb). In this case, PKax denotes the x-coordinate value of the public key PKa of the device A and PKbx denotes the x-coordinates value of the public key PKb of the device B.

An output of SHA-256 is truncated to 32 bits by taking the least significant 32 bits of the output of SHA-256. This value is converted into decimal numeric value. The checksum used for the numeric comparison model is the least significant six digits. The comparison result (compare value) is given by:

$$\text{Compare Value}=g(U, V, X, Y) \bmod 10^6 \quad (5)$$

If the output is 0x01 2e b7 2a, then its decimal value is 19838762. The checksum taken for the numeric comparison is 838762.

(3-2-3: Key Derivation Function f2 in SSP)

The definition of the key derivation function in the SSP uses the MAC function (HMAC) based on SHA-256. The HMAC is denoted as HMAC-SHA-256$_W$ with 192-bit key W. The inputs (W, N1, N2, KeyID, A1, and A2) to the SSP function f2 are:

W has a 192-bit value. N1 has a 128-bit value. N2 has a 128-bit value. KeyID has a 32-bit value. A1 has a 48-bit value. A2 has a 48-bit value.

The string "btlk" is mapped into keyID using extended ASCII code as:
KeyID[0]=0110 1011 (lsb),
KeyID[1]=0110 1100,
KeyID[2]=0111 0100,
KeyID[3]=0110 0010, and
KeyID=0x62746c6b.

The output of function f2 in the SSP is given by:

$$f2(W, N1, N2, \text{Key ID}, A1, A2)=\text{HMAC-SHA-256}W \\ (N1||N2||\text{Key ID}||A1||A2)/2^{128} \quad (6)$$

The output of function f2 is taken as the 128 most significant (leftmost) bits of the output of HMAC-SHA-256. The link key is computed as:

$$LK=f2(DHKey, N\_master, N\_slave, \text{"}bt|k\text{"}, BD\_AD \\ DR\_master, BD\_ADDR\_slave \quad (7)$$

(3-2-4: Check Function f3 in SSP)

The definition of the check function in the SSP uses the MAC function (HMAC) based on SHA-256. This HMAC is denoted as HMAC-SHA-256$_W$ with 192-bit key W. The inputs (W, N1, N2, R, IOcap, A1, and A2) to the SSP function f3 are:

W has a 192-bit value. N1 has a 128-bit value. N2 has a 128-bit value. R has a 128-bit value. IOcap has a 16-bit value. A1 has a 48-bit value. A2 has a 48-bit value.

IOcap is a set of octets (8 bits) with the most significant octet as the LMP OOB authentication data and the least significant octet as the LMP IO capability. The output of function f3 in the SSP is given by:

$$f3(W, N1, N2, R, |\text{Ocap}, A1, A2)=\text{HMAC-SHA-256}W \\ (N1||N2||R||IO\text{cap}||A1||A2)/2^{128} \quad (8)$$

The output of function f3 is taken as the 128 most significant (leftmost) bits of the output of HMAC-SHA-256. The check values are computed with function f3. The inputs to function f3 are different depending on each protocol, as shown in Table 3 below. DHKey denotes the shared secret Diffie-Hellman key computed as P192(SKa, PKb) by the device A and as P192(SKb, PKa) by the device B. Adata denotes data indicating the capability of the device A and Bdata denotes data indicating the capability of the device B. In the passkey entry model, the data ra and rb are 6-digit passkey values, which are expressed as a 128-bit integer. For example, if the 6-digit value of ra is 131313, then R=0x00 00 00 00 00 00 00 00 00 00 00 00 00 02 00 f1. The input A is the BD address of the device A. The input B is the BD address of the device B.

TABLE 1

Definition

| [Term] | [Definition] |
|---|---|
| Cx | Commitment value from device X |
| Cxi | i-th commitment value from device X. Only used in the passkey entry protocol |
| DHKey | Diffie-Hellman key |
| Ex | Check value from device X |
| f1( ) | Used to generate the 128-bit commitment values Ca and Cb |
| f2( ) | Used to compute the link key and possible other keys from the DHKey and random nonces |
| f3( ) | Used to compute check values Ea and Eb in Authentication Stage 2 |
| g( ) | Used to compute numeric check values |
| IOcapA | IO capabilities of device A |
| IOcapB | IO capabilities of device B |
| LK | Link Key |
| Nx | Nonce (unique random value) from device X |
| Nxi | i-th nonce (unique random value) from device X. Only used in the passkey entry protocol |
| PKx | Public Key of device X |
| rx | Random value generated by device X |
| rxi | Bit i of the random value rx. Only used in the passkey entry protocol |
| SKx | Secret (Private) Key of device X |
| Vx | Confirmation value on device X. Only used in the numeric compare protocol. |
| X | BD_ADDR of device X |

TABLE 2

Comparison of Protocols

| [Numeric Comparison] | [Out-Of-Band] | [Passkey Entry] |
|---|---|---|
| Ca = f1(PKax, PKbx, Na, 0) | Ca = f1(PKax, PKax, Ra, 0) | Cai = f1(PKax, PKbx, Nai, rai) |
| Cb = f1(PKbx, PKax, Nb, 0) | Cb = f1(PKbx, PKbx, Rb, 0) | Cbi = f1(PKbx, PKax, Nai, rbi) |

TABLE 3

Comparison of Protocols

| [Numeric Comparison] | [Out-On-Band] | [Passkey Entry] |
|---|---|---|
| Ea = f3(DHKey, Na, Nb, 0, IOcapA, A, B) | Ea = f3(DHKey, Na, Nb, ra, IOcapA, A, B) | Ea = f3(DHKey, Na20, Nb20, ra, IOcapA, A, B) |
| Eb = f3(DHKey, Nb, Na, 0, IOcapB, B, A) | Eb = f3(DHKey, Nb, Na, rb, IOcapB, B, A) | Eb = f3(DHKey, Nb20, Na20, rb, IOcapB, B, A) |

[Supplement 2: <WPS 1.0h>]

The technology according to the above-described embodiment of the present invention is preferably applicable to the WPS specification version 1.0h described below. An authentication method associated with WPS 1.0h will be described below in detail. Reference is made to Tables 5 to 10 for expressions and meanings of terms used hereinbelow.

[WPS (Wi-Fi Protected Setup)]

WPS is a standard independently developed by a Wi-Fi Alliance. WPS is designed to support Wi-Fi CERTIFIED (WFC) 80.11 devices. Examples of such devices include consumer electronics and phones as well as computers (PCs) and access points. This communication function applies to 802.11 devices for home, small office, and so on.

Some of the devices have extended functions to communicate through 802.11b, 802.11a, or 802.11g as well as multiple-band devices. Such an extended function is provided as an option for WFC programs. This option is also for 802.11n pre-standard products as well as products certified for the final 802.11n standard, expected in 2008. The Wi-Fi Alliance certified the first products that comply with WPS in January of 2007.

WPS helps assure consumers that purchased Wi-Fi devices can be more easily configured with security features enabled on their Wi-Fi networks. Also, the consumers can add new WPS devices to established networks with greater ease.

WPS is an optional certification. That is, not all certified products include it. WPS is specifically developed for the SOHO market, not for use in enterprise environments. In such enterprise environments, distributed network servers may be provided to control network access and information may be strictly managed by encryption technology. Consumers should check whether the identifier mark of WPS-WFC products is present. The WPS identifier mark is shown on products, packages, and user documentation.

WPS applies to typical home networks. In the home networks, devices communicate via an access point (AP) or a router. In such communication environments, "ad hoc" networks are not supported in many cases. The "ad hoc" network refers to a network in which devices directly communicate with one another, independently of an AP.

In typical communication environments, the network name (SSID) and WPA2 security key are set for the AP and WPS client devices on a network. WPS standardized approaches allow typical Wi-Fi users to easily set up and expand their Wi-Fi networks with security enabled. That is, the users do not have to understand the underlying technologies about the security and networks or processes involved. That is, for example, users no longer have to know that SSID refers to the name of the network or that WPA2 refers to the security mechanism.

WPS uses WPA2 personal technology. The WPS technology is compatible with legacy devices that are Wi-Fi certified for WPA/WPA2 Personal. WPA and WPA2 represent the latest in security for Wi-Fi technology. Users must remember that using any legacy device (i.e., a device that is not Wi-Fi certified for WPA/WPA2 Personal) leaves their WLANs vulnerable. All WFC products certified after September 2003 support either WPA or WPA2. That is, products certified since March 2006 are required to support WPA2.

Products certified for WPS offer users two easy setup methods: a setup method using personal information identification number (PIN) and a setup method using push-button configuration (PBC). Needless to say, WPS is designed for extensibility to other methods. A verification method using near field communication (NFC) cards and USB flash devices are not expected to apply to a testing program in the late 2007.

Users may add their legacy devices to a Wi-Fi network that includes WPS-WFC devices, as they did previously, using the manual method provided by the device manufacturers.

WPS-WFC products are tested and then certified to allow both PIN and PBC configurations in APs. At least PIN authentication configuration is tested in client devices before the certification.

A registrar issues credentials necessary to enroll new clients on the network. The register can be located in a variety of deices, such as an AP or a client. In order to enable users to add devices from multiple environments and locations, the specification also supports including multiple registrars in a single network. Registrar capability is mandatory in an AP.

In PIN configuration, a PIN is provided for each device that will connect to the network. A fixed label or sticker is typically placed on a device so as to allow the PIN to be identified by the user. When a dynamic PIN is generated, the PIN is shown on the display (e.g., a TV screen or monitor) provided at the device. The PIN is used to ensure that the device that the user intends to add to the network is the one that is added and to help avoid accidental or malicious attempts of others to add unintended devices to the network.

The user first enters the PIN into the registrar. The PIN is input, for example, via a graphical user interface (GUI) on the AP or by accessing a management page via an onscreen interface provided on another device on the network.

In PBC configuration, the user connects the device to the network and enables data encryption by pushing buttons on the AP and client device. In this case, users should be aware that there is a very brief setup period between pushing the AP and client buttons during which unintended devices within range could connect to the network.

(Comparison of Setup Step)

Table 4 shows a comparison between operation steps of PIN authentication configuration and PBC authentication configuration. For reference, Table 4 also shows steps required in WLAN configuration and security activation using a pre-WPS method. Table 4 shows that the pre-WPS method has a large number of steps.

In the pre-WPS method, the user activates the AP by connecting it to a power source and to a wired network (step 1). Subsequently, from a computer that is connected to the wired network, the user launches a web browser to log into an administrative page and access the AP (step 2). The user then selects a network name (SSID) and inputs it to the AP (step 3).

The user is then navigated to a security settings page. The user selects the type of security to be used to active the security settings (step 4). After activating the security settings, the user is prompted to enter a passphrase that the AP will use to generate the security key. The user then sets a passphrase for the AP to set a security key (step 5). The user configures the client device to be enrolled on the network through a control panel. This activates the wireless interface the device and enables the WLAN connection (step 6).

Then, the client device presents the user with the network names (SSIDs) of all WLANs found in the vicinity. The user selects the appropriate network name (selected in step 3) and connects to the network (step 7). The user is then prompted to enter the passphrase set in step 5. The user then enters the passphrase to the client device (step 8). Thereafter, the client and the AP exchange security credentials and the new device is securely connected to the WLAN.

In many cases, the use of WPS eliminates steps 2 to 5 described above. In addition, WPS simplifies some of tasks (e.g., the setting of a passphrase) required of the user.

With WPS, the user simply activates the AP and the client device. The user then enters the PIN provided by generating means of the AP (for PIN configuration) or pushes buttons on the AP and client device(s) (for PBC configuration) to initiate the secure setup. In this case, the user is no longer requested to set a passphrase. That is, the security codes are automatically activated and communicated.

In addition to ensuring that the SSID and WPA2 security keys are properly configured, WPS provides over-the-air safeguards to prevent users who enter incorrect PINs from accessing the network. WPS also includes a time-out function to cancel the configuration process when identifying that credentials are not transferred in a timely fashion.

WPS also enhances security by also eliminating user-created passphrases. Before WPS, users were required to create and enter a passphrase on the AP. They also might reuse the passphrase when adding any new device to the network in order to secure their networks. Many passphrases opted for short familiar passphrases, such as the name of a child or pet, which are easy to remember but also easy for an outsider to guess.

(WPS Option)

As options of WPS, authentication methods using NFC and USB are available. These methods allow devices to join a network without requiring the manual entry as in PBC authentication method and a PIN based method.

With WPC NFC configuration method, a secure network is activated simply by touching the new device to the AP or another device with a registrar capability. In WPS USB configuration method, credentials are transferred via a USB flash drive (UFD). These methods provide strong protection against adding an unintended device to the network.

The methods for the USB and NFC are scheduled for a WFC program for WPS in the late first quarter of 2007. Other methods may also be added to the certification program over time, as the WPS specification is designed for extensibility to other technologies.

(WPS Configuration)

Detailed configuration means and WPS device security can be compared to the familiar "lock and key" metaphor of traditional home security. The WPS specification provides a simple, consistent procedure for adding new devices to established Wi-Fi networks based on a discovery protocol. The protocol is also consistent across venders.

This procedure automatically uses a registrar to issue the credentials of devices being enrolled on the network. WPS-WFC APs have a registrar capability. Additionally, the registrar can reside on any device on the WLAN. A registrar that resides on the AP is referred to as an internal registrar. A registrar that resides on another device on the network is referred to as an external registrar. A WPS network can support multiple registrars on a single WLAN.

The process in which the user configures a new device on the WLAN begins with an action that can be compared to inserting a key into a lock. This process involves launching the configuration wizard and entering the PIN, or pushing the PBC button. At this point, access is detected.

The WPS devices initiate exchange of information with the registrar. The registrar then issues the network credentials. The network credentials include the network name and security key for authorizing the client to join the WLAN. In the lock-and-key metaphor, this is akin to turning the key in the lock as access is granted. The new device can then securely communicate data over the network, against unauthorized access by intruders.

When a new WPS-WFC device comes within the range of an active AP, the presence of the device is detected. The WPS-WFC device then communicates to the registrar and prompts the user to initiate the action that authorizes the issuance of registration credentials.

The WPS network encrypts data to authenticate each device. Thus, information and network credentials are securely exchanged over the air using an extensible authentication protocol (EAP). The EAP is one of the authentication protocols used in WPA2. The devices execute mutual authentication, and are connected when the client is accepted onto the network. The registrar communicates the network name (SSID) and the WPA2 "pre-shared key (PSK)", to enable security. Use of a random PSK enhances security by eliminating use of pass phrases that could be predictable.

The pre-WPS configuration method required the user to manually configure the AP to support a PSK and manually enter the SSID and PSK. The entry of the SSID and PSK are performed on both the AP and the client. This approach is subject to user errors. The user errors include mistyping, confusion of PSK and SSID, and so on. With WPS, however, the credentials exchange process requires little user intervention after the initial setup action is competed. Examples of the setup action include entering the PIN or pushing the PBC button. In this case, the network name and the PSK are automatically issued.

A diagram illustrating credential exchange and device addition will now be described. Specifically, a description will be given of how WPS devices configure a network.

(Credential Exchange)

In a WPS, the registrar device prompts the other devices on the network to issue their identifying information, and then provides them with credentials. At this point, information is exchanged over the Wi-Fi network. In one scenario, the registrar is set at the AP. The credentials exchange may follow the push of a button on the client and on the AP (PBC method). Alternatively, the credentials exchange may follow the entry of a PIN from the client device (PIN method). In the latter case, for example, the PIN is entered by the user into a GUI for use in the PIN method.

(Adding Devices)

When new clients are added to an existing network, they may be configured via a PIN or push button. Also, for example, when new AP devices are added to an existing network, they can be configured via a PIN or push button. Which of PIN and PCB is used is dependent upon which configuration method is supported by the client device.

(Optional Configurations for WPS)

PBC and PIN configuration options are available for WPC-WFC products. The NFC and USB configurations are optional and are not tested and certified by the Wi-Fi Alliance. The manufacturers, however, can optionally provide those configuration methods. The configuration methods for the NFC and USB are scheduled to be included in a WFA certified test program for WPS in 2007.

(NFC Configuration)

NFC configuration uses touch-based interactions. The NFC configuration also uses NFC to enable the exchange of network credentials between the AP (or other registrar device) and the client. The credentials exchange begins when the user touches an NFC-enabled client device to the NFC target mark on the AP (or other NFC-enabled registrar device) or brings the client within close proximity of it. The distance is about 10 cm.

The registrar reads the client's identifying credentials from an NFC token embedded in the device. The registrar then sends the network SSID and PSK security code back to the client to enable the new device to join the network.

(USB Configuration)

In USB configuration, credentials are exchanged by connecting a USB flash drive to a registrar device (an AP in this case). The credentials are copied on the flash drive. The flash drive is then inserted into a new device, thereby completing the credentials exchange.

(Conclusions of WPS)

WPS offers users a uniform set of setup approaches. It includes the entry of a PIN and a push button sequence. The set of setup approaches makes it easier to configure new WFC devices and enable security on WFC networks in homes and small office environments.

WPS is designed to enhance the user's out-of-box experience with WFC devices, reduce dependence on vendor technical support, reduce the number of product returns at retail, and increase user satisfaction with the technology. In particular, WPS makes network configuration easier by eliminating the requirement that users understand concepts such as PSK and SSID, and by removing the unforgiving process of manual key entry for PSKs.

WPS is designed for extensibility to make it possible to support both the 2.4 GHz and 5 GHz frequency bands to support 802.11a, b and g WFC devices. Although the certification itself is an optional, it can be applied to devices for home and small office, including those that are multiband and multi-mode. The option is planned to apply to WFC programs for 802.11n pre-standard products in 2007. The option is also planned to apply to products certified for the final 802.11n standard, expected in 2008.

TABLE 4

Steps to Set Up Network (Numerals indicate steps)

| [Without Wi-Fi Protected Setup] | [Wi-Fi Protected Setup with PIN] | [Wi-Fi Protected Setup with PBC] |
| --- | --- | --- |
| 1. User activates AP | 1. User activates AP | 1. User activates AP |
| 2. User accesses AP | 2. User activates client device | 2. User activates client device |
| 3. User selects a network name (SSID) and enters it on the AP | 3. A network name (SSID) is generated automatically for the AP and broadcast for discovery by clients. | 3. A network name (SSID) is generated automatically for the AP and broadcast for discovery by clients |
| 4. User activates security settings on the AP | 4. User accesses the Registrar through a GUI on the AP, or via a Web browser or UI on another device on the network. | 4. User pushes buttons on both the AP and client device. |
| 5. User sets passphrase on the AP | 5. User enters client's PIN into the Registrar via UI or Web browser. | |
| 6. User activates client device | | |
| 7. User selects network name | | |

TABLE 4-continued

Steps to Set Up Network (Numerals indicate steps)

| [Without Wi-Fi Protected Setup] | [Wi-Fi Protected Setup with PIN] | [Wi-Fi Protected Setup with PBC] |
|---|---|---|
| 8. User enters passphrase on the client. | | |

TABLE 5

Mandatory and Optional Configurations

| [Mandatory Configurations for Wi-Fi Protected Setup Certification] | [Optional Configurations] |
|---|---|
| Personal Identification Number (PIN) | Near Field Communications (NFC) |
| Push Button Configuration (PBC) | Universal Serial Bus (USB) |

TABLE 5-continued

Mandatory and Optional Configurations

| [Mandatory Configurations for Wi-Fi Protected Setup Certification] | [Optional Configurations] |
|---|---|
| | (mandatory for APs, optional for client devices) |

TABLE 6

Terminology 1

| | |
|---|---|
| Access Point (AP) | Often a Wi-Fi router, a device that connects wireless devices to a network. |
| Advanced Encryption Standard (AES) | The preferred standard for the encryption of commercial and government data using a symmetric block data encryption technique. It is used in the implementation of WPA2. (See 802.11i, WPA2.) |
| Authentication | The process, during which the identity of the wireless device or end-user is verified, so that it may be allowed network access. |
| Credential | A data structure issued by a registrar to a client, in order to allow it to gain access to the network. |
| Device | An independent physical or logical entity capable of communicating with other devices across a Local Area Network (LAN) or Wireless Local Area Network (WLAN). |
| Client | Any device connected to a network that is able to request files and services (files, print capability) from the server or other devices on the network. |
| Discovery Protocol | A method used by the client and the registrar to discern the presence and capabilities of networked devices. |
| Extensible Authentication Protocol (EAP) | A protocol that provides an authentication framework for both wireless and wired Ethernet enterprise networks. |
| Guest | A Member with credentials that provide only temporary access to a Wireless Local Area Network (WLAN). |
| 802.11a, b, g | IEEE standards for a wireless networks that operate at 2.4 GHz (b, g) or 5 GHz (a) with rates up to 11 Mbps (b) or 54 Mbps (a, g). |

TABLE 7

Terminology 2

| | |
|---|---|
| Local Area Network (LAN) | A system of connecting PCs and other devices within the same physical proximity in order to share resources, such as an Internet connection, printers, files and drives. When Wi-Fi is used to connect the devices, the system is known as a wireless LAN or WLAN. |
| Network Name | A name used to identify a wireless network. In wireless standards, this is referred to as the service set identifier or SSID. |
| Near Field Communication (NFC) | A contact-less technology designed for short-range operation approximately 10 cm or less. NFC communication is enabled by touching an NFC Device with a contact-less card or NFC token. |
| NFC Device | A device that acts as a contactless reader/writer. NFC devices can communicate directly with each other and/or with NFC tokens. |
| NFC Token | A physical entity compliant with one of the mandatory NFC Forum tag specifications. An NFC Token cannot communicate with other NFC Tokens, but its content can be read or written by an NFC Device. |

TABLE 7-continued

| | Terminology 2 |
|---|---|
| NFC Target Mark | A graphical sign that marks the area on NFC Devices where they have to be touched with an NFC Token or another NFC Device to initiate an NFC connection. |
| Personal Identification Number (PIN) | A multi-digit number that is randomly generated to enroll a specific client device on a WLAN. (In the Wi-Fi Protected Setup program, the pin is 4 or 8 digits.) |
| Pre-Shared Key (PSK) | A mechanism that allows the use of manually entered keys or passwords to initiate WPA/WPA 2 security. |

TABLE 8

| | Terminology 3 |
|---|---|
| Push Button Configuration (PBC) | A configuration method triggered by pressing a physical or logical button on the enrollee device and on the registrar. |
| Registrar | A logical entity with the authority to issue and revoke domain credentials. A registrar may be integrated into any device, including an access point. Note that a registrar may or may not have WLAN capability, and a given domain may have multiple registrars. |
| Registration Protocol | A registration protocol is used to assign a credential to the enrollee. It operates between the enrollee and the registrar. |
| External Registrar | A registrar that runs on a device separate from the access point. |
| Internal Registrar | A registrar that is integrated in an access point. |
| Temporal Key Integrity Protocol (TKIP) | The wireless security encryption mechanism in Wi-Fi Protected Access (WPA and WPA2). |
| Universal Serial Bus (USB) | A high-speed bidirectional serial connection used to transfer data between a computer and peripherals such as digital cameras and memory cards. |
| USB Flash Drive (UFD) | A memory card or solid-state storage drive with a USB interface, which in the Wi-Fi Protected Setup program is used to store and transfer credentials. |
| WEP | Wired Equivalent Privacy, an early-generation technology, now superseded by WPA and WPA2. |

TABLE 9

| | Terminology 4 |
|---|---|
| Wi-Fi | A term developed by the Wi-Fi Alliance to describe WLAN products that are based on the Institute of Electrical and Electronics Engineers' (IEEE) 802.11 (a, b, g) standards. |
| Wi-Fi CERTIFIED | A product compliant with certification standards designating IEEE 802.11-based products that has passed interoperability testing requirements developed and governed by the Wi-Fi Alliance. |
| Wi-Fi Network | A Wireless Local Area Network. |
| Wi-Fi Protected Access (WPA) | An improved security standard for wireless networks that provides strong data protection and network access control. |
| Wi-Fi Protected Access version 2 (WPA2) | A next-generation security protocol/method for wireless networks that provides stronger data protection and network access control than WPA. |
| Wireless Router | A wireless router is device that accepts connections from wireless devices to a network and includes a network firewall for security, and provides local network addresses. |
| Wireless Local Area Network (WLAN) | A Wi-Fi network. |

TABLE 10

| Acronyms | |
|---|---|
| AES | Advanced Encryption Standard |
| AP | Access Point |
| EAP | Extensible Authentication Protocol |
| LAN | Local Area Network |
| NFC | Near Field Communication. |
| PBC | Push Button Configuration |

TABLE 10-continued

| Acronyms | |
|---|---|
| PDA | Personal Digital Assistant |
| PIN | Personal Identification Number |
| PSK | Pre-Shared Key |
| SSID | Service Set Identifier |
| SOHO | Small Office-Home Office |
| SSID | Service Set Identifier |

TABLE 10-continued

Acronyms

| | |
|---|---|
| TKIP | Temporal Key Integrity Protocol |
| USB | Universal Serial Bus |
| UFD | USB Flash Drive |
| WLAN | Wireless Local Area Network |
| WPA | Wi-Fi Protected Access |
| WPA2 | Wi-Fi Protected Access version 2 |

While the preferred embodiment of the present invention has been described above with reference to the accompanying drawings, it goes without saying that the present invention is not limited to the particular embodiment. It is apparent to those skilled in the art that various changes and modifications can be made without departing from the spirit and scope of the present invention and it should be understood that such changes and modifications are also encompassed by the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device having a first communication section that supports a first communication mode having a low communication rate and a second communication section that supports a second communication mode having a higher communication rate than the first communication mode, the communication device comprising:
   a packet dividing section configured to divide a communication packet for the first communication mode into a first portion containing authentication information used for a connection authentication for the second communication mode and a second portion other than the first portion;
   an information adding section configured to add, to the first portion, information regarding the second portion obtained as a result of division performed by the packet dividing section; and
   a communication control section configured to perform a control to cause the first communication section to transmit the first portion to which the information regarding the second portion has been added by the information adding section, and to cause the second communication section to transmit the second portion after the connection authentication succeeds using the authentication information contained in the first portion.

2. The communication device according to claim 1, wherein the information adding section adds, to the first portion, mode identification information for identifying the second communication mode, and, in a case in which a target communication device does not support the second communication mode, the communication control section causes the first communication section to transmit the communication packet for the first communication mode, the communication packet including the first portion and the second portion.

3. The communication device according to claim 1, wherein the second portion contains type information indicating a type of an application using the second communication mode and option information used for launching an application indicated by the type information, and the type information and the option information are used to launch the application.

4. The communication device according to claim 1, wherein the first portion further includes a list of communication protocols that are usable by the second communication section and a list of option information used for a connection authentication for each communication protocol included in the list.

5. A communication device having a first communication section that supports a first communication mode having a low communication rate and a second communication section that supports a second communication mode having a higher communication rate than the first communication mode, the communication device comprising:
   a packet dividing section configured to divide a communication packet for the first communication mode into a first portion containing authentication information used for a connection authentication for the second communication mode and a second portion other than the first portion;
   an information adding section configured to add, to the first portion, division information indicating whether or not the first portion is a portion obtained as a result of division and mode identification information for identifying the second communication mode; and
   a communication control section configured to perform a control to cause the first communication section to transmit the first portion to which the division information and the mode identification information have been added by the information adding section, and to cause the second communication section to transmit the second portion after the connection authentication succeeds using the authentication information contained in the first portion,
   wherein in a case in which a target communication device does not support reception of a packet which is obtained as a result of division, the communication control section causes the first communication section to transmit the communication packet for the first communication mode, the communication packet including the first portion and the second portion.

6. The communication device according to claim 5, wherein the second portion contains type information indicating a type of an application using the second communication mode and option information used for launching an application indicated by the type information, and the type information and the option information are used to launch the application.

7. The communication device according to claim 5,
   wherein the first portion further includes a list of communication protocols that are usable by the second communication section and a list of option information used for a connection authentication for each communication protocol included in the list.

8. A communication device having a first communication section that supports a first communication mode having a low communication rate and a second communication section that supports a second communication mode having a higher communication rate than the first communication mode, the communication device comprising:
   a communication control section configured to perform a control such that a communication packet for the first communication mode is divided into a first portion containing authentication information used for a connection authentication for the second communication mode and a second portion other than the first portion, and the first communication section is caused to receive a communication packet obtained by adding information regarding the second portion to the first portion;
   a determination section configured to determine, in accordance with the information regarding the second portion, whether or not the second communication section supports a reception of the second portion obtained as a result of division; and a connection authentication section configured to authenticate a connection performed by the second communication section in accordance with the authentication information, wherein the communication control section performs a control such that the second communication section receives the second portion after the determination section has determined that the reception of the second portion is supported and the connection performed by the second communication section is successfully authenticated by the connection authentication section.

9. The communication device according to claim 8, wherein the second portion contains type information indicating a type of an application using the second communication mode and option information used for launching an application indicated by the type information, and the type information and the option information are used to launch the application.

10. The communication device according to claim 8, wherein the first portion further includes a list of communication protocols that are usable by the second communication section and a list of option information used for a connection authentication for each communication protocol included in the list.

11. A communication method for a communication device having a first communication section that supports a first communication mode having a low communication rate and a second communication section that supports a second communication mode having a higher communication rate than the first communication mode, the communication method comprising:

dividing a communication packet for the first communication mode into a first portion containing authentication information used for a connection authentication for the second communication mode and a second portion other than the first portion;

adding, to the first portion, information regarding the second portion obtained as a result of division in the dividing;

transmitting, from the first communication section, the first portion to which the information regarding the second portion has been added in the adding;

authenticating a connection by using the authentication information contained in the first portion; and transmitting, from the second communication section, the second portion after the connection authentication succeeds.

12. A communication method for a communication device having a first communication section that supports a first communication mode having a low communication rate and a second communication section that supports a second communication mode having a higher communication rate than the first communication mode, the communication method comprising:

dividing a communication packet for the first communication mode into a first portion containing authentication information used for a connection authentication for the second communication mode and a second portion other than the first portion;

adding, to the first portion, division information indicating whether or not the first portion is a portion obtained as a result of division and mode identification information for identifying the second communication mode;

transmitting, from the first communication section, the first portion to which the division information and the mode identification information have been added in the adding;

authenticating a connection by using the authentication information contained in the first portion; and transmitting, from the second communication section, the second portion after the connection authentication succeeds, wherein, in the transmittings, in a case in which a target communication device does not support a reception of a packet which is obtained as a result of division, the communication packet for the first communication mode, the communication packet including the first portion and the second portion, is transmitted by the first communication section.

13. A communication method for a communication device having a first communication section that supports a first communication mode having a low communication rate and a second communication section that supports a second communication mode having a higher communication rate than the first communication mode, the communication method comprising:

dividing a communication packet for the first communication mode into a first portion containing authentication information used for a connection authentication for the second communication mode and a second portion other than the first portion, and receiving, by the first communication section, a communication packet obtained by adding information regarding the second portion to the first portion;

determining, in accordance with the information regarding the second portion, whether or not the second communication section supports a reception of the second portion obtained as a result of division; and authenticating a connection performed by the second communication section in accordance with the authentication information, wherein the second communication section receives the second portion in the receiving after it is determined in the determining that the reception of the second portion is supported and the connection performed by the second communication section is successfully authenticated in the authenticating.

\* \* \* \* \*